United States Patent [19]

Alston, Jr. et al.

[11] Patent Number: 5,315,709

[45] Date of Patent: May 24, 1994

[54] METHOD AND APPARATUS FOR TRANSFORMING OBJECTS IN DATA MODELS

[75] Inventors: Lawrence E. Alston, Jr., Framingham; John J. Farrell, III, Lowell; Kenneth W. Quayle, III, Stow, all of Mass.

[73] Assignee: Bachman Information Systems, Inc., Burlington, Mass.

[21] Appl. No.: 621,751

[22] Filed: Dec. 3, 1990

[51] Int. Cl.⁵ .............................................. G06F 15/40
[52] U.S. Cl. ..................... 395/600; 364/DIG. 1; 364/282.1; 364/282.2; 364/283.3
[58] Field of Search .............. 364/DIG. 1, DIG. 2; 395/500, 600, 650, 700, 800

[56] References Cited

U.S. PATENT DOCUMENTS

| | | |
|---|---|---|
| 4,205,371 | 5/1980 | Feather ........................... 395/DIG. 1 |
| 4,631,664 | 12/1986 | Bachman ............................ 364/200 |
| 4,864,497 | 9/1989 | Lowry et al. .................. 395/DIG. 1 |
| 4,908,759 | 3/1990 | Alexander, Jr. et al. .... 395/DIG. 1 |
| 4,930,071 | 5/1989 | Tou et al. ..................... 395/DIG. 1 |

*Primary Examiner*—Robert B. Harrell
*Attorney, Agent, or Firm*—Lappin & Kusmer

[57] ABSTRACT

The invention is directed to a computer implemented system and apparatus for transforming objects in a first data model (source design objects) to objects in a second data model (target design objects) and synchronizing the two data models. The result of the transformation is that at least one of the target design objects is associated with a corresponding source design object. The system associates a unique identifier with each of the target design objects and source design objects, the unique identifier being associated with each map associated with each design object.

98 Claims, 11 Drawing Sheets

METHOD AND APPARATUS FOR TRANSFORMING OBJECTS IN DATA MODELS

BACKGROUND

The present invention relates to a computer system for manipulating data models, more particularly the invention relates to a computer system for translating objects in one data model to objects in a second data model.

Information data models are used by information management personnel to model business environments and assure efficiency of operations. The computer systems involved in modeling such environments necessarily involve complex computer-level manipulations, since the environment that is being modeled consists of many complex and interrelated objects. Such information systems exploit database management technology to promote efficient design, enhance file maintenance and modification, eliminate data file redundancy, and provide substantial documentation regarding data file structure.

The implementation of an information management system utilizing database management technology involves the concept of dual data representation: i.e., logical representation; and physical representation. Logical representation relates to the form in which the data records are presented to and interact with the system user. Physical representation relates to the form in which individual data records are stored and how the records are manipulated by the computer system. The physical representation of the data is generally of little or no concern to the end-user, since the task of manipulating data storage areas is a function of the system, and as established by systems designers.

Of most concern to the system end-user, however, is the logical representation of the data, since the user's ability to store, retrieve, and modify aggregations of data items, data records, and data relationships is dependent upon the form in which the data base management system presents data to the user.

Information management systems operate in complex environments often consisting of hundreds or thousands of elements, or objects, and relationships, permitting users to manipulate and employ data in many ways. Representation of such elements and relationships to a user presents a set of problems not encountered, and certainly not resolved, by present data base management systems. Instead of being organized into application-oriented files, which are always addressed in the same way, as in database systems, the information may be organized so that it can be addressed in a variety of different ways, and can be used to answer a diversity of queries. Object-oriented systems currently offer the most effective means for handling such information.

Information management systems enable generation and manipulation of data models. In the past few years, different data models have evolved to represent the complex objects and relationships of objects for a given environment by different representations. In one object-oriented system, the Bachman Analyst TM system, available from the assignee of the current application, Bachman Information Systems, Inc., Burlington, Mass., the objects of a data model are represented by entities and associated attributes. In that system, the relationships among entities and attributes may be diagrammatically shown in a type of network-structure, Entity-Relationship (E-R) diagram. This type of data model is referred to as an extended entity data model, to describe the representation of objects in the model as entities and attributes. In another system, DB2 TM system available from IBM Corporation, Armonk, N.Y., the objects are represented by tables and associated columns. This type of data model is referred to as a relational data model, reflecting the fact that the objects are defined by their relationship to other objects in the model.

In a work environment utilizing an information system having such data models, it is often desirable to enable users to work with either, or both, of two different data models representing the same information. There is a need for a system which enables a user to work in more than one data model environment, or design space, and to translate data models developed in one environment into another environment. The process of translation from one data model to another, is referred to as "engineering." In the field, it is known to assign a directionality for translations between two data models, so that translation is said to occur through "forward" or "reverse" engineering. In forward engineering, a term primarily used with respect to the F-R editor of the Bachman Analyst system, objects are translated from an extended-entity data model to a relational data model. In a similar fashion, reverse engineering refers to translating from a relational data model to an extended-entity data model. In such data models, the extended-entity data model is relatively compact while the relational data model is not. As a result, a user may define a model in Analyst design space using a highly efficient methodology, and then may forward engineer that model to the DB2 design space where the model may be fully expressed with great detail. Thus, the advantage of forward engineering from the Analyst design to the DB2 design spaces is that it enables the representation of a relatively large amount of information by user input of a relatively small amount of information. Alternatively, a user could specify a model, or portion of a model, in great detail in the DB2 design space, and then, through reverse engineering, obtain a compact, efficient representation of that model in the Analyst design space.

However, in the prior art, enabling a user to work in two environments, or design spaces, introduces potential inconsistencies and conflicts between the resulting two data models. For example, if a user creates a data model using an extended entity data model, and wants to view the model in a relational data model construct, forward engineering may be performed on the objects. To be effective, the translation, or engineering time must be relatively short, and the user must be able to continue working on the extended entity model. If the relational model is static during changes made to the extended entity model, the changes reflected in the extended entity model will not be reflected in the relational model. As a result of such situations, there is a need for periodic synchronization between the two data models. This synchronization process has not been effectively accomplished in the prior art, so that users can work independently in the two data spaces.

One way prior art systems have approached translation between data models is by associating objects across the design spaces by object name as the object is created. Thus, when an object with an associated name "CUSTOMER" is created in one environment, the name "CUSTOMER" is unique to the named object. During the translation of the object to the other environment, a new object name "CUSTOMER.NEW" is created which is related to "CUSTOMER" via the object name. However, one problem encountered by that prior art system is that if, for example, the user changes the name from "CUSTOMER" to "CUSTOMER2" in the first environment, a different identifier then becomes associated with the newly named object. Thereafter, when the system looks to find the previously translated "CUSTOMER.NEW" and its related object in the first environment, it determines that the object no longer exists.

While on an object-by-object basis this poses a technical problem that perhaps could be successfully addressed, in a complex multi-object information system environment the problem is compounded. In such an environment, each object has uniquely associated properties, constraints and rules. Some of the constraints are generated automatically upon creation of the named object For example, in a relational model, when a Table is created called "TABLENAME", it may have a constraint "length=11 characters", or a rule that the contents are alphanumeric. During, for example, reverse engineering from a relational model to an extended entity model, most of the constraints and properties are carried over to the translated object. Thus, if the object in one environment is renamed such that a new identifier is created, the translation and necessary synchronization will be ineffective.

A similar situation arises when an object in either design space is modified. In prior art systems, modification of an object in one design space, whether by name, property or constraint, results in the need for a new translation of that object into the second design space. This effectively precludes a user, or multiple users, from working in two data model design spaces.

In addition, the manager of a complex multi-object information system implementing particular data models must be able to retain some control over the naming of objects in both models. For example, if one user names certain objects in the extended entity model "CUSTOMER", and another user names those same objects in the relational model "NAMES", any subsequent translation between the two models may result in duplicate objects and improper transformations. Thus, there is also a need for a naming standard which is invoked by the computer system to assure naming control over the two data models.

SUMMARY OF THE INVENTION

Accordingly, it is an object of the present invention to provide an improved computer system for translating or transforming objects from one data model to another data model.

It is another object to provide a computer system which synchronizes two data models.

It is yet another object of the invention to provide a computer system having a naming standardization system to assure naming control over multiple data model environments, such that named objects in a data model of one environment will correspond to named objects in a data model of another environment.

Other objects, features, and advantages of the invention will be apparent from the following figures, description of the preferred embodiments thereof, and from the claims.

Briefly, the current invention is a computer implemented system for transforming objects in a first data model to objects in a second data model. Generally, the first data model consists of source design objects (SDO) in a source design space, and the second data model consists of target design objects (TDO) in a target design space. The result of the transformation is that at least one of the TDO's is associated with a corresponding SDO. In accordance with another aspect of the invention, the system further synchronizes the first and second data models. In addition to SDO's and TDO's, each data model may also be treated as a design object, herein referred to as a model object, in accordance with the invention.

The system associates a unique identifier with each of the SDO's and TDO's. Each object in the two design spaces has an associated map, containing map objects. The map objects generally are parameters for implementing a set of rules. At least one of such rules drives the transformation. The system converts an SDO and its associated map into at least one conversion object (CO) and associated conversion map, in accordance with SDO transformation rules. The system then merges the CO, together with its associated map into at least one corresponding TDO, creating a merged object and associated merged map. The end result is a target design space, including merged objects or target objects, each object having an associated unique identifier which is related to the unique identifier of the originating source design object.

In the preferred embodiment of the invention, the first data model is an extended entity data model, and the second data model is a relational data model (with the transformation being referred to below as "forward engineering"). Alternatively, the system may transform objects from a relational data model to an extended entity data model (referred to below for the preferred embodiment as "reverse engineering").

In one form of the invention, each object in the two design spaces may have an associated system map and a user map, where the system map (containing the unique identifier for the object) is immutable by a user, and the user map is selectively modifiable by a user.

Alternatively, in another embodiment of the invention, there may be a composite map related to each pair of associated objects in the two design spaces. In this form, a single unique identifier is associated with the composite map, and a unique relationship is established between each source design object and its corresponding target design object.

To achieve synchronization following periods of independent operations on models in each of two design spaces, the objects in the source design space are each transformed to merged objects in accordance with the system of the invention prior to further independent processing. Preferably, each source object is identified as a particular classtype in the design space. In one embodiment of the invention, transformation of the SDO's into merged objects occurs not only over all objects in a design space, but is performed per class, in a preestablished hierarchy of processing order. Thus, all SDO's of one classtype are processed before SDO's of another classtype.

During the conversion step, the system identifies instances where there are zero, one, or more TDO's in the target design space. For those instances where there are no identified TDO's, the system initiates an appropriate action in response to that instance. Appropriate actions include deleting the source object map, rebuilding a user map, and creating a null map for the source design object in the target design space.

The system further may generate a naming template to enable standardized naming, or name control, in the respective data model environments. The naming template facilitates naming objects in the source design space so that the resultant names will correspond to names in the target design space and vice versa. The template provides a selectively predetermined object identifier and a selectively modifiable object variable. The name of the design object thus consists of a user-selected portion and a predetermined portion, enabling a single user to independently name objects, while reserving to the system manager name control across the data models.

Once each CO and related TDO has an associated name, derived from the naming process, the system further effects merging. The action taken by the system during merging is dependent upon the condition of the TDO and/or target design space To identify the condition of the TDO or target design space, the system implements several merging steps. One step may include identifying instances when both the name and map associated with a CO matches both the name and map of one of the target design objects. In that instance, the system fuses the CO with that TDO, and then overwrites the properties of the CO to that TDO.

Another merge step may include identifying instances when the name of a CO matches the name of one of the TDO's, but the conversion map does not match the target design map. In that instance, a signal is generated to advise the user of the conflict, asking the user to initiate an appropriate action. An appropriate action includes appending the conversion map to the target map, renaming the conversion object, or appending the conversion map to the target object map followed by over-writing the properties of the conversion object to the target design object.

Yet another merge step may include identifying instances when the conversion map matches the target design map, but the names do not match. Again, in that instance a signal is generated to advise the user of the conflict, asking the user to initiate an appropriate action. An appropriate action in that instance includes appending the target map to the SDO associated with the CO, then building the CO into the target design space and over-writing the properties of the CO to the TDO. Alternatively, the action may include removing the target map, then building the CO into the target design space. Another appropriate action may include replacing the source design map with the target map, then over-writing properties of the SDO to the TDO.

A fourth merge step may include identifying instances when there is neither a map match nor a name match between a CO and a TDO. In that instance, the system may initiate addition of the CO to the target design space.

The system of the invention may also implement the comparison of a merged object with a predetermined set of rules, identifying instances when the merged map is inconsistent with one or more of the rules, and generating a signal representative of each instance. In the preferred embodiment, the portion of the system that performs this function is referred to as an Advisor. The Advisor signal may include error messages to the user, or may include queries or prompts to the user to resolve the conflicts or inconsistencies. Following a user response to the signal, the system then resolves these identified inconsistencies.

Following transformation of the SDO's to merged objects in the target design space, then during a target processing ("verfication") phase, a confirmation is made that the SDO's referenced in the maps of the merged objects in the target design space (i.e., the modified TDO's) are in fact referenced to valid and corresponding SDO's. When this target processing phrase is complete, then the two data models are said to be synchronized. After that point, the user may again independently access and modify the models of either or both design spaces.

The TDO's of the system may further include references to zero, one, or more SDO's. The target maps may also contain such references. The system may implement the step of identifying instances when the TDO reference is to zero of the SDO's, generally defined as a null reference. For each of these instances, the system selectively modifies the TDO, for example by removing the TDO from the target design space, defined as delete propagate.

The system may further implement the identification of instances when the target map reference is to zero of the SDO's. For each of these instances, the system may selectively modify the TDO and its associated map in accordance with a predetermined action. This action may implement the substeps of delete propagate, nullify target, or delete map. The nullify target substep removes the target map reference from the target map, whereas the delete map step deletes the target map containing the reference.

In the system of the invention, each of the TDO's are selectively modifiable by a user. Thus, the system of the invention further may maintain the unique target identifier (in the system map) associated with a target map for each modified TDO. By so doing, new identifiers are not created each time a TDO is modified.

BRIEF DESCRIPTION OF THE DRAWINGS

Like reference characters in the respective drawn figures indicate corresponding parts.

DESCRIPTION OF THE PREFERRED EMBODIMENT

Figure 1A:
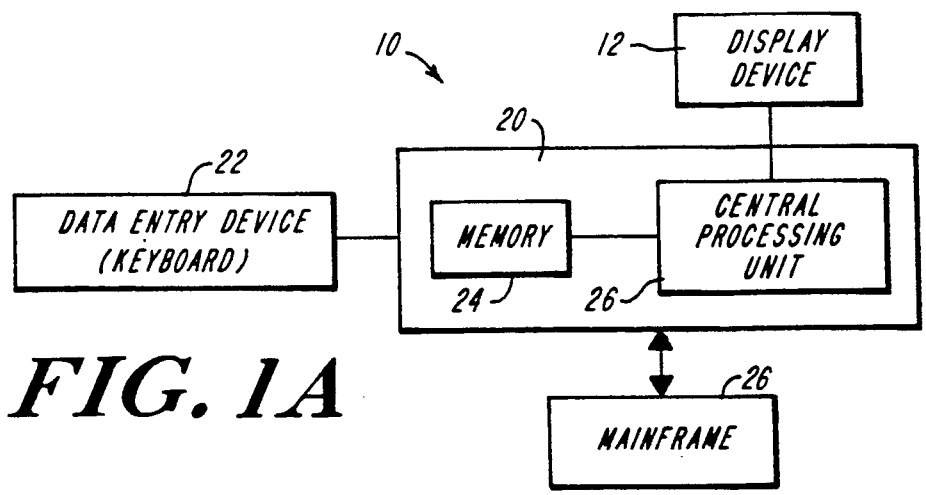
FIG. 1A shows in block diagram form a system embodying the invention.

A system 10 embodying the invention is shown in general form in FIG. 1A. The system 10 includes a Central Processing Unit (CPU) 26 and at least one memory device 24. The CPU is accessed by an end-user via a display device 12 and a data entry device 22. System 10 is in communication with mainframe computer 26.

In the preferred embodiment of the invention disclosed herein, a system 10 operates using a programmed IBM-compatible 80386 personal computer, having an OS/2 operating system. Other computer hardware and operating systems, such as UNIX or DOS, may be used, with some modifications to the software. Although the preferred embodiment uses C as its programming language, other programming languages may be used to implement the current invention. The software product known as DB2, available from IBM Corporation, Armonk, N.Y., resides on mainframe computer 26.

Bachman Analyst TM (release 3.10) software product resides in system 10, together with a patch (as set forth in object code in Appendix A) and Bachman DBA for DB2 (DBA/DB2) software product (as set forth in object code in Appendix B).

The system 10 assists data analysts and systems analysts in designing models for a work environment, enabling dynamic interaction between the system user and the data models. The data bases based on such models may be established and maintained in the mainframe computer 26.

Figure 1C:
FIG. 1C shows a graphic representation of the design spaces of the system of FIG. 1A.
Figure 1B:
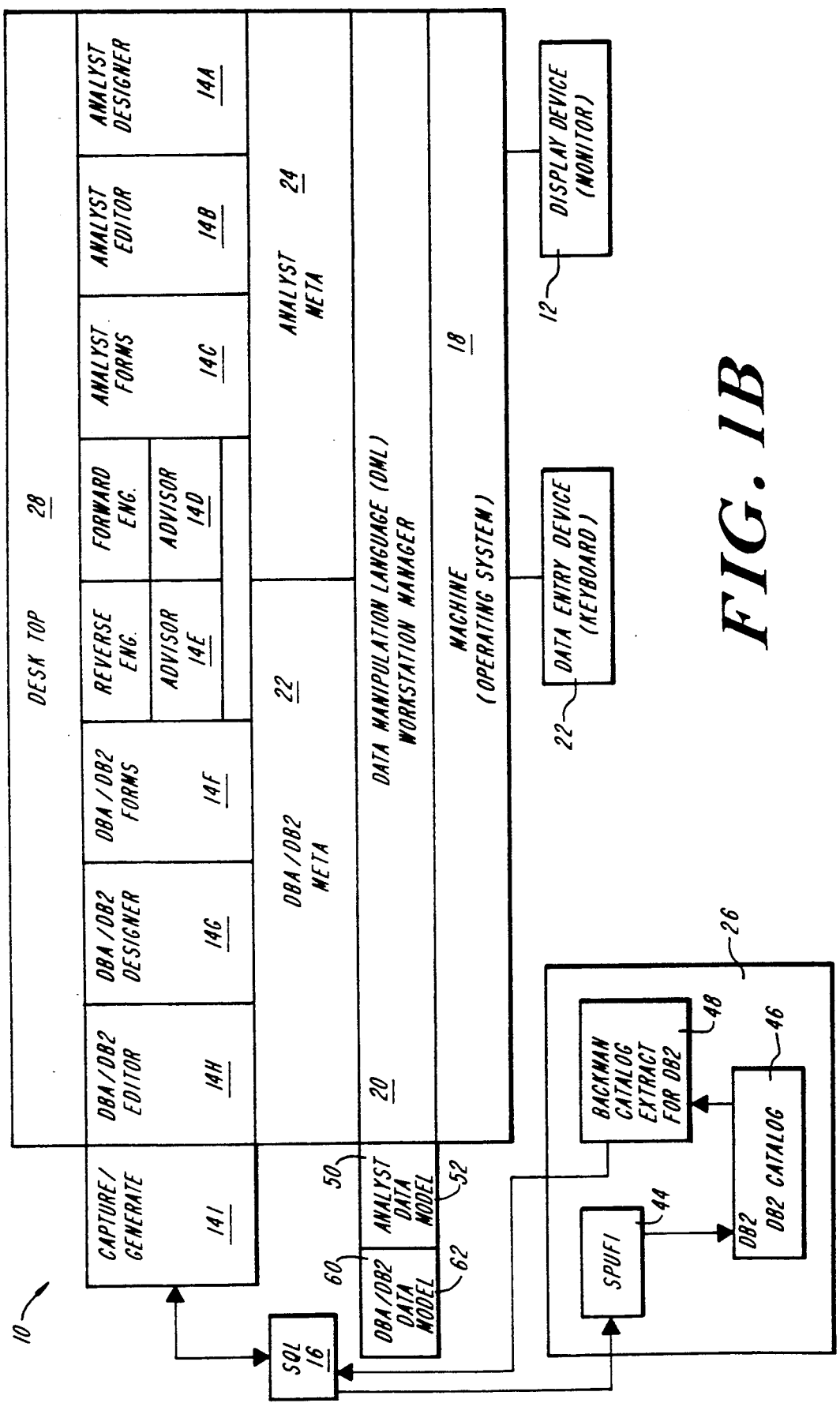
FIG. 1B shows in functional module block diagram form the system of FIG. 1A.

The system 10 is illustrated in functional module block diagram form in FIG. 1B. As shown in FIG. 1B, the system 10 includes a machine (or processor)/operating system 18 coupled to a display device 12 and a data entry device 22. The Bachman Analyst system overlays the machine/operating system 18 and includes a Data Manipulation Language (DML) workstation manager 20, an Analyst Meta system 24 and associated Analyst Designer (14A), Analyst Editor (14B), and Analyst Forms (14C) modules. In accordance with the current invention, the system 10 includes the DBA/DB2 system, which includes a DBA/DB2 Meta system 22 and DBA/DB2 Editor (14H), DBA/DB2 Designer (14G), and DBA/DB2 Forms (14F). The DBA/DB2 system further includes Reverse Engineering/Advisor (14E), Forward Engineering/Advisor (14D), and Capture/Generate (14I) modules, and Desk Top module 28. Analyst and DBA/DB2 design spaces are identified in FIG. 1B by reference numerals 50 and 60, respectively, whereas the design models are identified by reference numerals 52 and 62, respectively.

The Bachman Analyst system includes Analyst Forms 14C, Analyst Editor 14B, and Analyst Designer 14A functional modules, Analyst Meta 24, DML 20, Analyst Design 52, as well as Analyst Designer 14A, Analyst Editor 14B, and Analyst Forms 14C.

As illustrated in FIG. 1B, the interaction between user and machine 18 occurs via a visual display device 12, such as a computer monitor, operating in concert with a data entry device 22, such as a keyboard. Communications between system 10 and mainframe computer 26 are established via SQL file 16.

The data models created in the system 10 are generated into SQL file 16 and sent, via a communications link to a capture program 44, for example SPUFI TM system available from International Business Machines, Inc., Armonk, N.Y., which program is located in the mainframe 26. SPUFI system then enables the model to be in communication with a DB2 catalog of the DB2 product 46. In this manner, models created in the modeling environment of the system 10 may be used in the database residing in conjunction with the mainframe computer 26.

Data definition information from the DB2 database 46 may be transferred to SQL 16 via an interface 48. In the preferred embodiment, the interface 48 is Bachman Catalog Extract for DB2, available from Bachman Information Systems, Inc., Burlington, Mass. The information is captured by the system 10 from the interface 48 via the Capture/Generate module 14I.

The workstation manager 20, includes a Data Manipulation Language (DML) and not only serves as an interface between the machine 18 and the meta systems 22, 24, but also provides the environment for the creation and manipulation of data models in the two design spaces 50 and 60. As illustrated, these design spaces may be used to establish, for example, an Analyst design 52 and a DB2 design 62. The meta systems 22, 24 are the object services component of the system 10, and interface with the functional modules 14A-14H of the two data models. The meta systems 22, 24 contain object definitions for the respective models.

The two distinct logical design spaces established by system 10 are represented, along a time (t) axis, in FIG. 1C, including a first design space 50 for a first data model 52, and a second design space 60 for a second data model 62. In the preferred embodiment, by way of example, the first design space 50 is established by the Bachman Analyst, and the second design space 60 is established by the Bachman DBA for DB2 TM software product.

Upon the establishment by a user of a data model in one design space, it may be desired to establish a data model in the other design space which corresponds to the same information. Also, after the establishment of two data models in separate design spaces corresponding to the same information, a user interaction with one or both of the data models virtually always modifies the respective models so that they no longer correspond to a common information set. In both of these circumstances, it is desirable to transform, or translate, a resultant model in its space to the other model in the other space.

The process of translating or transforming one data model in one design space to another data model in another design space is referred to as "engineering". Engineering may be driven in either direction, i.e., from one design model to another. Once a hierarchy is assigned to each of the respective design spaces, the directionality of engineering may be specified as being either "forward" or "reverse". That is, in a system, if an extended entity model design space is assigned priority over a relational model design space, "forward" will be defined as a processing direction from the extended entity model to the relational model. In that system, processing direction from the relational model to the extended entity model is defined as "reverse". The preferred embodiment described herein has that exemplary hierarchy, although other hierarchies could be used in other embodiments.

An important aspect of the invention is to achieve synchronization of two designs in their respective design spaces (that is, to establish that both models correspond fully to the same information set). Either model may be "synchronized" to the other. The current invention achieves synchronization, in part, by performing a target processing, or verification phase. Thus, for purposes of the following description of the invention, the phrase "forward engineering" is used to include both forward transformation and verification phases, to achieve synchronization. Similarly, the phrase "reverse engineering" includes both reverse transformation and verification phases to achieve synchronization. As mentioned above, the direction of engineering is driven by the priority assigned to each design space.

For example, referring to the Analyst/DB2 models of the preferred embodiment, during forward engineering, thus defined, the DB2 model 62 is synchronized to match the Analyst model 52, including forward transformation and verification. Conversely, during reverse engineering, the Analyst model 52 is synchronized to match the DB2 model 62, including reverse transformation and verification. Each phase of the engineering, i.e., forward/reverse transformation and verification, are discussed in further detail below.

Figure 1D:
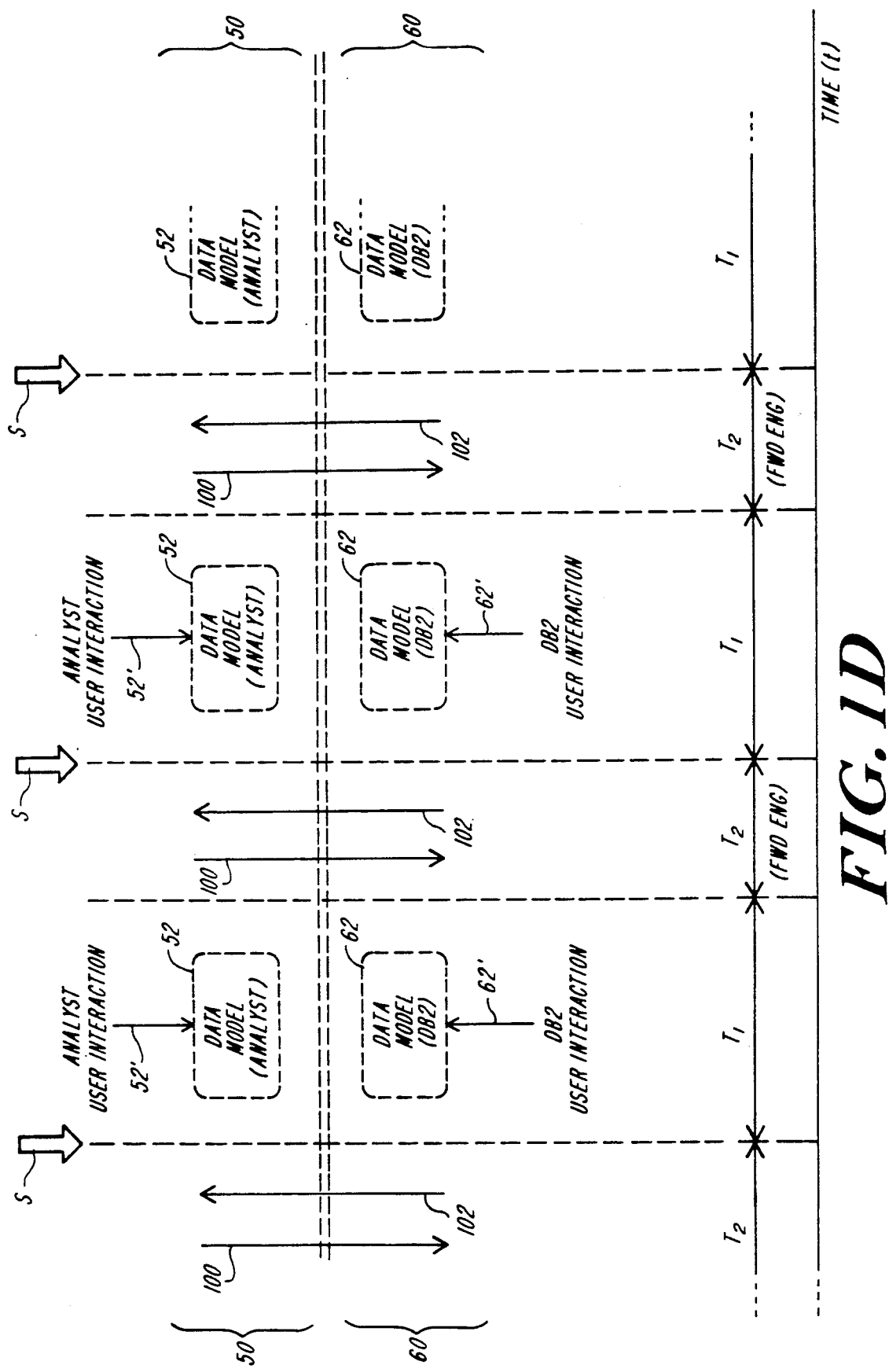
FIG. 1D illustrates the operation of the system of FIG. 1A.

The overall operation of system 10, including user modification and synchronization of the data models, is illustrated in FIG. 1D. In that figure, the Analyst design space 50 is shown separated from the DB2 design space 60 by a double broken line. The design spaces 50 and 60 are shown along a time (t) axis. During time periods denoted $T_1$ in FIG. 1D, the data models 52 and 62 in the respective design spaces may be modified by user interaction, as indicated by arrows 52' and 62', respectively. Following the end of the $T_1$ periods, the respective models are synchronized during the periods denoted $T_2$. During the $T_2$ periods, the users may not modify the respective models. In the illustrated embodiment for DB2-to-Analyst synchronization (forward engineering), there is a forward transformation followed by verification denoted by arrows 100 and 102, respectively. At the end of the $T_2$ periods, the models 52 and 62 are synchronized (denoted by arrows S), and $T_1$ periods commence during which users may again interact with the respective data models until the next $T_2$ period begins.

ENGINEERING

In general, it is a design goal of the current invention to generate, modify, and maintain parallel data models in each of the two design spaces, for example, an Analyst design in the first design space and a DB2 design in the second design space, where the two designs correspond to the same data, or information in a synchronized manner. To maintain flexibility for the user, the system of the invention permits modifications of the two designs by allowing a user to independently modify one or both of the designs during predetermined time intervals, and then following each such interval, synchronize the resultant divergent designs, so that they again correspond to the same data.

As described above, FIG. 1D illustrates engineering of the data models in design spaces 50 and 60 on a time axis t. The time axis indicates first time periods $T_1$, followed by second time periods, $T_2$. During $T_1$ periods, a user may independently generate or modify objects in one or both of data models 52 and 62 in the respective design spaces 50 and 60, resulting in divergence in the two data models. During $T_2$ periods, the system synchronizes those models by means of transformation 100 and verification 102 so that the two models 52, 62 are synchronized at times S.

In general, the design spaces are either source design space or target design space. A source design space is that space containing the model objects to be transformed into another (i.e. the "target") design space. A target design space contains objects which have been transformed from a source design space. The designation of source or target design space is a result of assigning a priority or hierarchy to each space. In the illustrated example of FIG. 1D, the source design space is designated as 50, having data model 52, which is forward transformed 100 to target design space 60, having data model 62. Once the transformation 100 is complete, the objects in the target space are verified 102, and the design spaces "cleaned up" to remove residual or unrelated objects or artifacts. In the preferred embodiment, design space 50 includes an Analyst data model, which is assigned a hierarchy over the DB2 data model in design space 60.

Figure 2:
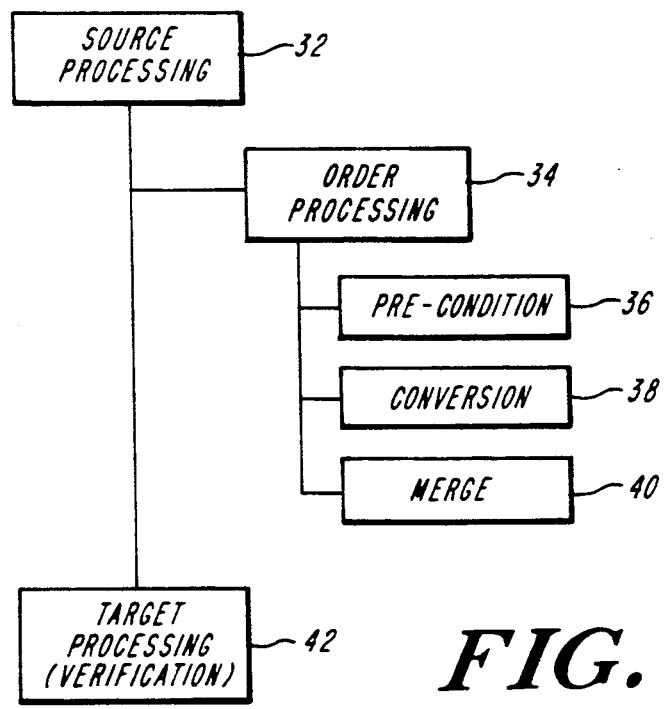
FIG. 2 is a structure chart of an embodiment of the system of the invention.

The current invention establishes a synchronization operation using a synchronization subsystem 30 whose operation is depicted in the preferred form in FIG. 2. In the description of the operation of subsystem 30 below, for a T2 synchronization interval in FIG. 1D, it is initially assumed that only the source data model has changed since the last synchronization interval, although the invention is also similarly operative for the situation when both data models have changed or only the target data model has changed.

In general, on an object-by-object basis, each object in the source design space is first forward transformed to the target design space. Then, during a verification, or target processing phase, the objects in the target design space are checked against the objects in the source design space for consistency. FIG. 2 shows a structure chart representing the operation of the synchronization subsystem 30. The subsystem 30 operates in a series of phases or steps which enable translation of data objects from one data model to another data model. Generally, and as shown in FIG. 2, the process for subsystem 30 includes a Source Process Phase 32 and a Target Process (Verification) Phase 42. The Source Process Phase includes an order processing step 34, a precondition step 36, a conversion step 38, and a merge step 40, and a Target Process Phase 42. Each of these phases and steps are discussed separately below.

In the preferred embodiment, "forward engineering" effects the forward transformation and verification of an Analyst design to a DB2 design. Maps, described in detail below, contain parameters used by rules to drive the transformation. All Analyst and DB2 design objects are related across designs by such maps. However, engineering may be used to transform a DB2 design to an Analyst design. Rules reside in the engineering process and are well-known to those skilled in the art. In addition, the engineering transformation rules of the current invention are available in the Bachman Analyst release version 3.10.

As described above, the directionality of engineering is driven by the hierarchy or priority assigned to each design space. The design that is being processed is called the source design, and includes source design objects (SDO's). In the Analyst extended entity data model, these objects include Entities and Attributes. The design in the second design space which results from forward engineering is the target design. The target design contains transformed source design objects, which are referred to as target design objects (TDO's). In the relational data model of the DB2 design space, these objects include Tables and Columns.

In the preferred embodiment, the Analyst data model includes partnership constructs, as described generally in U.S. Pat. No. 4,631,664 (Bachman), and U.S. patent application Ser. No. 516,248. These partnerships are representative of objects in the source design space, and are represented by Foreign Keys in the relational data model. In general, partnership translations are performed after other objects are translated.

Engineering may effect translation of source design objects to target design objects on a one-to-one, one-to-many, or many-to-many basis. This is true for both the simple relationships and the partnerships. Further, engineering may be performed on a subset (or "class") of objects in a design space. The objects contained in the subset to be engineered and thus synchronized may either be determined by the user, or predetermined by the system.

MAPS AND IDENTIFIERS

An important aspect of the current invention is the inclusion of maps in association with objects in the source and target design spaces. Maps serve three functions: 1) to enable the user to drive engineering, either forward or reverse; 2) to enable the user to view the relationships between design objects in the different design spaces; and 3) to synchronize the two data models. All design objects in the two data models are related across the designs by maps. The maps include system maps and user maps and are associated with SDO's as source maps, and TDO's as target maps. The respective maps generally include data pointing to related objects in the respective design spaces, but may be empty maps (having no such data) or may be null maps (which point to only one object).

Figure 3A:
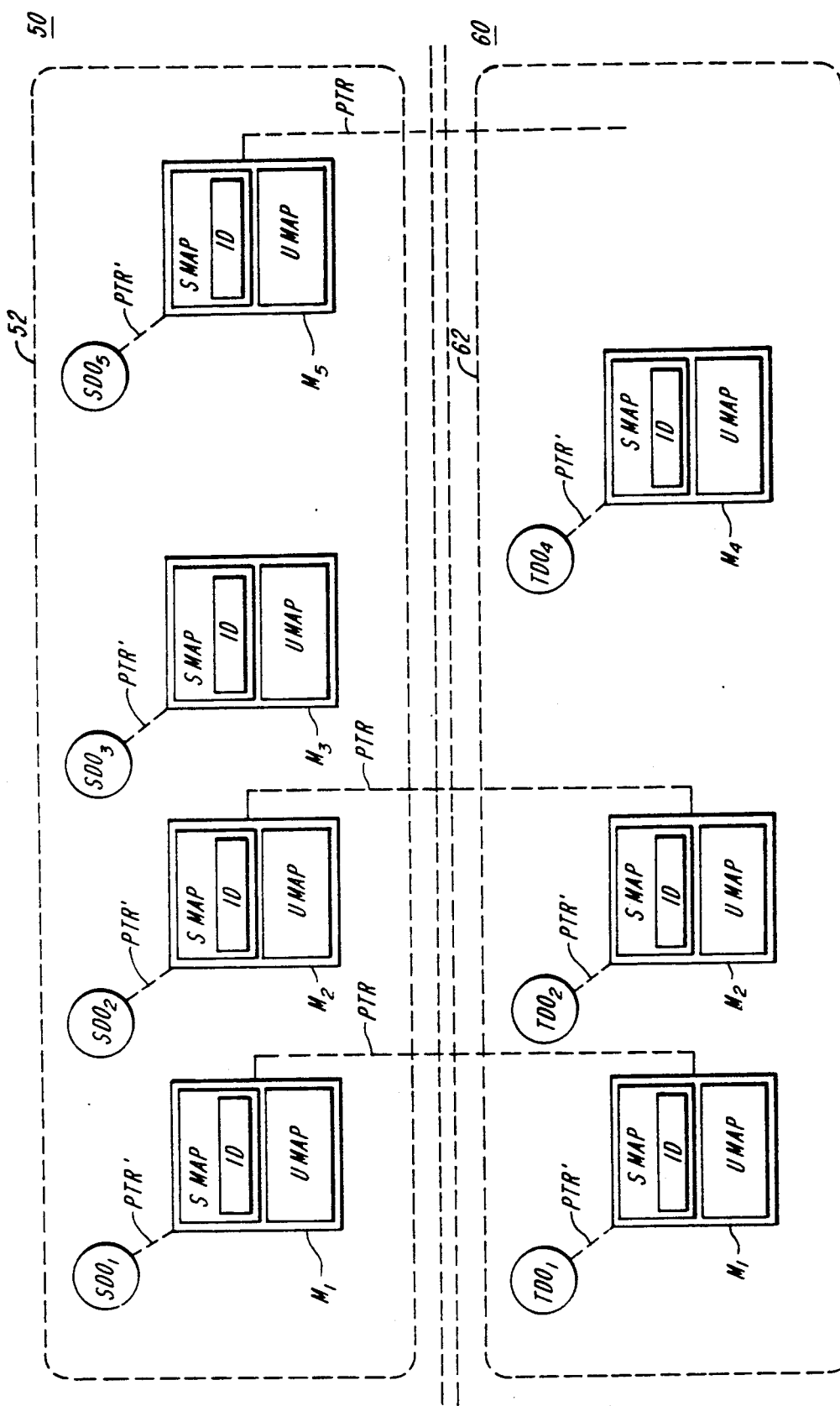
FIGS. 3A and 3B show alternative map configurations for objects in the design spaces of the system of FIG. 1A.
Figure 3B:
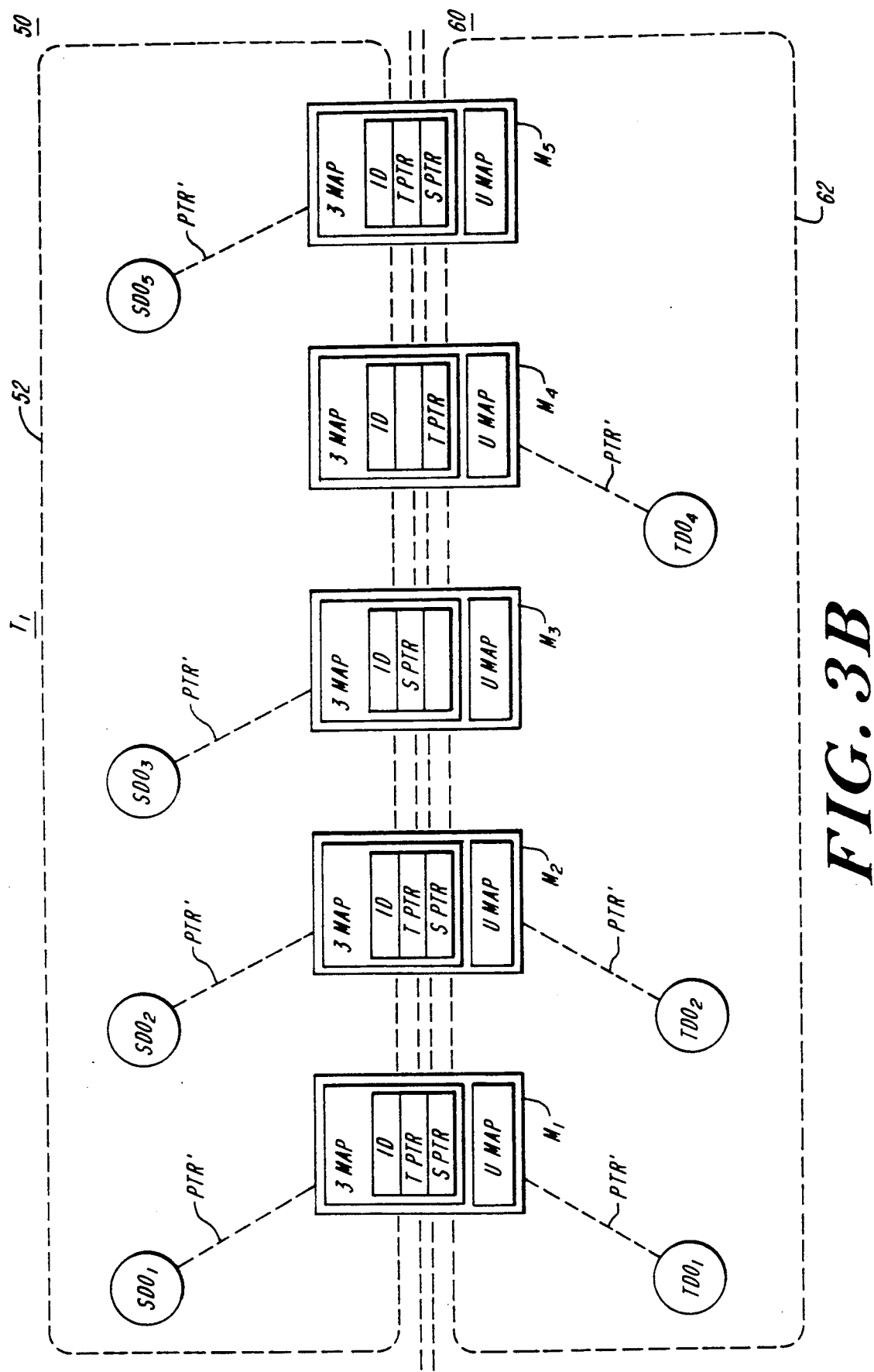

FIGS. 3A and 3B illustrate alternative map configurations for SDO's and TDO's in the design spaces 50 and 60 (during $T_1$ periods in which the respective models 52 and 62 are divergent), showing the maps associates with those objects. Corresponding SDO's and TDO's and their associated maps (M) are denoted with common subscripts. Each M map includes a system map (S MAP) and a user map (U MAP). In FIG. 3A, $SDO_1$ and $SDO_2$ each have corresponding objects ($TDO_1$ and $TDO_2$, respectively) in the target space, while $SDO_3$ has no such corresponding object, and $TDO_4$ has no corresponding object in the source design space. The maps M1 and M2 each include a unique identifier (ID) in its S MAP and include pointers to each other (PTR) and to their respective associated objects (PTR'). The map M3 includes a unique identifier (ID) and only a pointer (PTR') to $SDO_3$ and no PTR, since that map is an empty map. Similarly, the map M4 includes a unique identifier (ID) and only a pointer PTR' to $TDO_4$ and no PTR, since that map too is an empty map. Map M5 includes unique identifier (ID), pointer (PTR') to its object and also pointer (PTR) to an object in the other design space that does not exist. Map M5 is a null map.

FIG. 3B shows a map configuration for the same objects as FIG. 3A, but where instead of separate maps in the respective design space, the related objects have a common composite map which spans the two design spaces, and each system map contains a source pointer (S PTR) and a target pointer (T PTR) which correspond to the PTR's of FIG. 3A. The system 10 may establish the maps in any convenient memory location.

Figure 4:
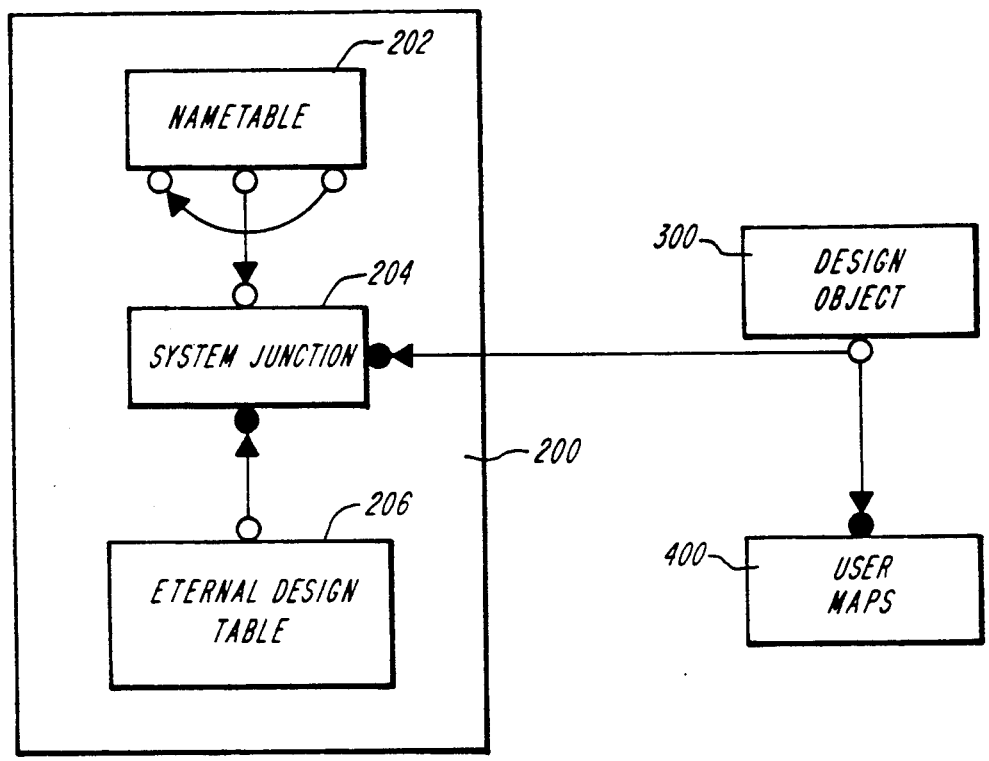
FIG. 4 shows a block diagram of a system map and a user map of the current invention.

In system 10, the respective maps are generally implemented in the form of objects in the respective design spaces. System maps are mapping specifications generated by engineering. As shown in FIG. 4 for design space 52 in the partnership set notation, an exemplary system map 200 is implemented by these objects: NameTable 202; System Junction 204; and, External Design Table 206. These objects are related by specified relationships to each other as well as to a design object 300. The system maps cannot be directly edited by the user, thus they are effectively immutable. However, they may be indirectly edited through the use of user maps. As shown, a design object 300 may have many associated user maps 400 and/or many system maps 200. These objects contain parameters which are used by system rules to drive the transformation process. In the preferred embodiment, NameTable object 202 contains at least parameters of object name and object type, and External Design Table object 206 contains at least parameters of design name and design type. The System Junction object 204 serves as a junction point for the two other objects, to link all the information contained in the three objects (i.e., including other information contained in the System Junction object 204).

For design space 60, the objects for the system maps are implemented as other objects in DB2 (i.e., as tables and columns).

In the preferred embodiment, the NameTable 202 includes the name of the Entity to which it maps, and a system-generated identifier, or Surrogate Key. It is important to note that a model object does not include a NameTable in its map, but has only a System Junction and External Design Table, with the design name residing in the External Design Table.

It is the Surrogate Key, and not the object name, which is a unique identifier (ID) that relates objects across designs, i.e. from one design space to another. For example, in the preferred embodiment, the NameTable for an Analyst design contains related DB2 design object names. The names in NameTable are updated when engineering occurs. However, Surrogate Keys are generated by the system of the invention and are not changeable by either the user or, once generated, by the system.

The System Mapping Table (SMT) 204 contains a Surrogate Key associated with the overall design, i.e., the data model object, as compared with the Surrogate Key associated with the design object. For example, in the preferred embodiment, the SMT for an Analyst design has references to related DB2 design objects, and a DB2 design has references to related Analyst design objects.

By maintaining the two tables and associated Surrogate Keys, each design object, as well as each design space, has an associated Surrogate Key. The External Design Table (EDT) 206 contains information regarding the design type for each design, i.e., whether the design is an extended entity design, a relational design, or some other appropriate design type. In total, a System Map consists of at least one object name, object type, object Surrogate Key, design name, design type, and design Surrogate Key. However, for model objects, the System Map does not contain an object name or object type.

Using the System maps described above, a user mapping a Column to the Attribute of an Entity will result in a Surrogate Key being associated to both the Attribute and the Entity.

User maps are specification entered by a user to effect engineering. User maps reflect the user's wishes, but they may not be reality, since information contained in System maps may override the information entered into User maps. User maps relate design objects using user-viewable names. User maps have a life cycle starting at the time the user enters them into the system and ending when they are transformed in engineering, at which point their information is incorporated into system maps, as appropriate.

Figure 5A:
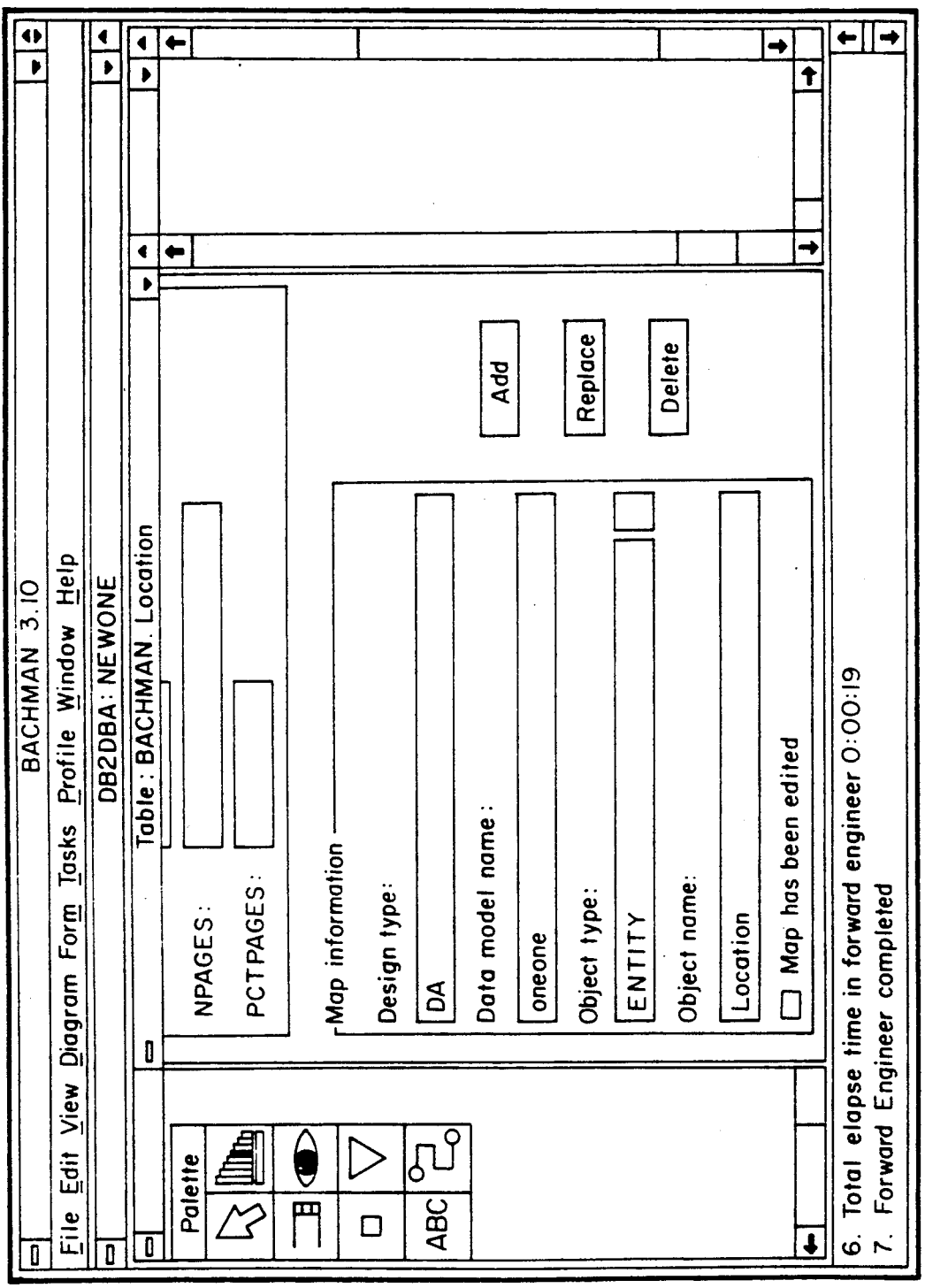
FIG. 5A shows a Table Form displaying maps to the Entity "LOCATION" in an exemplary DB2 data model named "ONEONE".
Figure 5B:
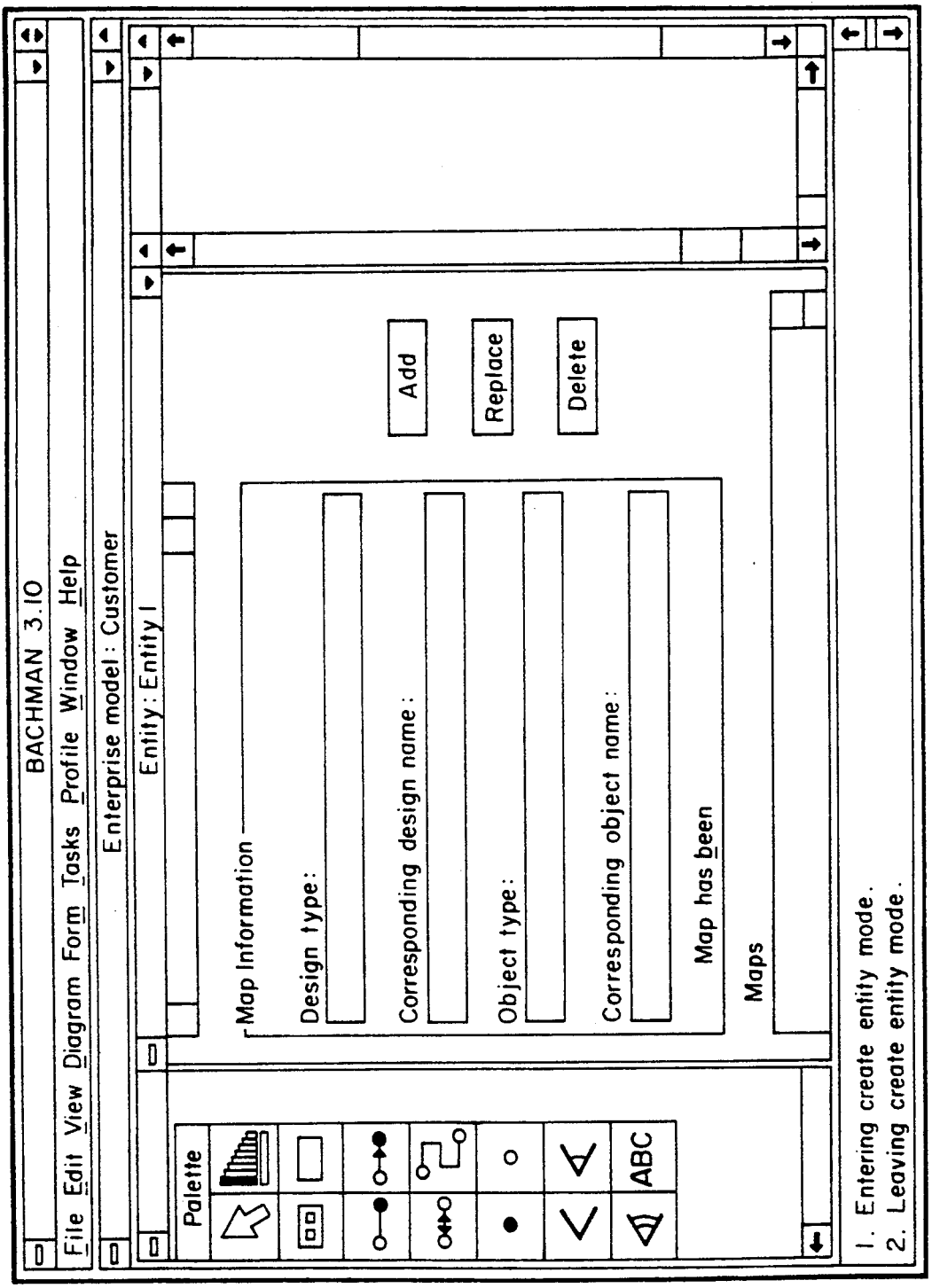
FIG. 5B shows a blank Entity Form in an exemplary Analyst data model.

As shown in FIG. 5A, a User map may be specified by a user using a form 500 in a DB2 data model, and, as shown in FIG. 5B, by a form 502 in an analyst data model. However, unlike System maps, User maps do not contain Surrogate Keys. Thus, a user may not affect the unique identifier associated with each object or design, enabling the system to maintain control over the design spaces.

FORWARD/REVERSE TRANSFORMATION

Referring now to FIG. 2, during the SOURCE PROCESS phase 32, system 10 retrieves and processes any source design objects (SDO's) related to the target design. An SDO is related to a target design if it does not have a Null map referring to the target design. The SOURCE PROCESS phase is broken down into a number of phases, each phase performing specific functions. These phases include "ORDER PROCESSING" 34, "PRE-CONDITION" 36, "CONVERSION" 38, and "MERGE" 40.

ORDER PROCESSING 34 iterates over the SDO's in a predetermined manner, based on a designated classtype of each SDO. The object is then passed to PRE-CONDITION 36 for further processing in accordance with its three functions. The first function is verification that a TDO, related to an SDO by a System Map, exists in the target design. If this state is not "TRUE", the user is informed of the conflict through an appropriate Advisor. Once the user receives an Advisor, an action may be selected from a predetermined list of actions. In the preferred embodiment, these actions include: DELETE MAP, EXPLICITLY REBUILD MAP, IMPLICITLY REBUILD MAP, or NULLIFY. The following Table I outlines the factors that determine the possible actions and the default action (in bold) for a given example of the preferred embodiment:

TABLE I

|  | SDO refers to TDO | SDO does not refer to TDO |
|---|---|---|
| TDO deleted or removed | Delete Map; Explicitly Rebuild Map; Implicitly Rebuild Map; Advisor | Nullify; Explicitly Rebuild Map; Implicitly Rebuild Map; Advisor |

DELETE MAP action deletes the System Map in question from the source design space. EXPLICITLY REBUILD MAP action makes engineering use the System Map specification to rebuild a User Map. The effect of this is the generation of or connecting to the object specified by the System Map. IMPLICITLY REBUILD MAP action causes creation of a User Map, and the generation of or connecting to the object specified by the Empty Map Rule. NULLIFY action entirely removes the reference to the target design by creating a Null map for the SDO. The effect of this action is that the SDO will not be related to the target design. For all of these actions, no changes are made to any non-map properties of the SOO.

The second function of PRE-CONDITION assurance that the System and User maps of the design object do not conflict. If there is a conflict with the maps, the user will be asked to select from predetermined actions. In the preferred embodiment, these actions include REMOVE SYSTEM MAPS, and REMOVE USER MAPS. The following Table II outlines the factors and actions available, with default actions in bold print, for an example of the preferred embodiment:

TABLE II

|  | NULL | NOT NULL | DON'T EXIST |
|---|---|---|---|
| NULL | No Conflict | Remove System Map(s) Remove User Map(s) Advisor | Build System Map for NULL |
| NOT NULL | Remove System Map Remove User Map(s) Advisor | No Conflict | No Conflict |

The third function of PRE-CONDITION synchronization of the NameTable with respect to any referenced name for a TDO in the System map.

CONVERSION 38 transforms an SDO into a conversion object (CO) as if there were no other objects in the target design space. For example, in the current embodiment converting from Analyst design space to DB2 design space, an Entity is converted to a Table. CONVERSION also interprets and acts upon either System maps or User maps that may exist for an SDO. These maps are guaranteed to be valid because of prior actions during PRE-CONDITION. A conversion object is a TDO that also has the name, and Surrogate Key of the related SDO. For example, in the preferred embodiment, the CO is a DB2 object, which has the name of the related Analyst object.

MERGE 40 integrates newly created CO's, located in the target design space, into the target design. There are four different instances which determine how a CO is merged with the rest of the target design. The first instance is when the CO has a corresponding object of the same class level and name in the target design space. In the preferred embodiment, this is referred to as NAMEMATCH. The class of an object includes, for example, whether the object is a Table, Column, Entity, or Attribute.

The second instance occurs when there is NAMEMATCH, and the TDO has a map which matches the map corresponding to the conversion object. In the preferred embodiment, this instance is referred to as MAPMATCH. The third instance is when there is no NAMEMATCH, yet there is MAPMATCH between the CO and any object in the target design of the same class as the conversion object. In this instance, the system checks for an SDO having a corresponding system map which refers to this identified object. In the fourth instance, there is neither NAMEMATCH nor MAPMATCH.

In response to the first instance, i.e., NAMEMATCH, the appropriate action is to FUSE the two design objects Fusing forces the properties of the SDO to over-write properties of the target design object. The user may intervene in the fusion action, in which case the system will perform the user-prompted action.

In response to the second instance, i.e., NAMEMATCH and MAPMATCH, the user is required to resolve the conflict between the target and source by selecting a sub-action. In the preferred embodiment, this main action is MERGE/CONFLICT TARGET, having the three sub-actions: APPEND; BUILD; or, APPEND/BUILD. If the user selects APPEND, the map associated with the CO is appended to the map associated with the TDO and the objects are fused. If the user selects BUILD, the user is reqested to uniquely rename the CO, which is then added to the target design. If the user selects APPEND/BUILD, the map associated with the CO is appended to the map associated with the TDO and the objects are fused. The user is then asked to uniquely rename the CO and it is added to the target design. If the TDO in question maps to a non-existing SDO, the APPEND action is the default action. The default action is determined by looking at the specification used for the creation of the CO and how the TDO maps to the other source design object. For example, if the CO creation is specified by an Empty map, the TDO maps to an SDO by the BUILD action. If the CO creation is specified by either a System map or a User map, the TDO maps to an SDO by an APPEND action.

The action elicited by the third instance, i.e., MAPMATCH but no NAMEMATCH, is MERGE/CONFLICT SOURCE. This action forces the user to resolve a conflict between the source design and a set of targets by selecting an appropriate sub-action. In the preferred embodiment there are three such sub-actions: APPEND SOURCE; REMOVE REFERENCE; or, REPLACE SOURCE. If the user selects APPEND SOURCE, the map in question is appended to the SDO, the CO is built into the target design, and the object referred to by the APPEND map is fused. If the user selects REMOVE REFERENCE, the map associated with the TDO is removed and the CO is built into the target design. If the user selects REPLACE, the map in question is replaced on the SDO and the TDO referred to by the APPEND map is fused. The CO is not built into the target design. The default action is determined by looking at the specification used for the creation of the CO, and at how the TDO maps to the SDO. For example, when the CO creation is specified by Empty map, the TDO maps to an SDO by REPLACE SOURCE. If the CO creation is specified by either a System map or a User map, the TDO maps to an SDO by APPEND SOURCE.

In the fourth instance, i.e., neither a NAMEMATCH nor a MAPMATCH, the appropriate action is to build a CO into the target design space without any user interaction. The following Table III outlines the possible instances and the appropriate actions available for each instance:

are directed to affecting the target design object. In the second two instances, the CO is compared against the target design space. Thus, the MERGE/CONFLICT SOURCE, and BUILD affect the target design space, not just a specific identified TDO within that space. Following implementation of these processing steps, a TDO exists in the target design space.

In the preferred embodiment, all Analyst Entities are translated into DB2 Tables during forward engineering. Each such Table has a name, an identifier of the creator or author ("Authid"), and design statistics. The name of the resulting Table is derived from the name of the source Entity, in accordance with the naming standards discussed below. The Authid for the new Table is determined by the default Authid specified in the design profile of the target DB2 design. Volume information of the source Entity is translated as design statistics for the Table.

In the preferred embodiment, all Analyst Attributes are translated into DB2 Columns during engineering. Generally, the Table in which a Column resides is determined by the System maps of the Entity associated with that source Attribute. For example, if the Entity "CUST" is translated into the Table "CUSTLIST", then all of the Attributes for the Entity "CUST" are translated into Columns in the Table "CUSTLIST". Attributes do not have data types of their own, generally only Attribute names and Nulls are translated to Columns. If the Table in which a Column is to be contained does not exist in the target design, the user is notified via an Advisor, and an appropriate action may follow. The resulting Table in which the new Column eventually resides is also determined by the map specified for the Attribute.

When an Attribute is engineered into a Column, all of the data type information for that Column is derived from the domain for that Attribute. The following is a table of exemplary forward transformations of domain data types in the preferred embodiment:

TABLE IV

| Data Type of Domain | Translates Into |
|---|---|
| Alphanumeric and alphabetic, when expected length = max. length | CHARACTER (max. length) |
| Alphanumeric and alphabetic, when expected length not equal to max. length and expected or max. length = <254 | VARCHAR (max. length) |
| Alphanumeric and alphabetic, when expected length not equal to max. length and expected or max. length >254 | LONG VARCHAR |
| Integer | INTEGER |
| Real (fixed-precision) | DECIMAL (precision, scale) |
| Real (variable-precision) | REAL |

TABLE III

|  | NAMEMATCH MAPMATCH | NAMEMATCH NO MAP-MATCH | MAPMATCH NO NAME-MATCH | NO MAP-MATCH NO NAME-MATCH |
|---|---|---|---|---|
| CONVERSION OBJECT | FUSE | MERGE/ CONFLICT TARGET; ADVISOR | MERGE/ CONFLICT SOURCE; ADVISOR | BUILD |

Note in the above Table III, that in the first two instances, a CO is compared against a TDO. Thus, the FUSE, and MERGE/CONFLICT TARGET actions

| Boolean | CHARACTER |
| Date dimension | DATE |
| Time dimension | TIME |

TABLE IV-continued

| Data Type of Domain | Translates Into |
|---|---|
| None | UNKNOWN |

A System map for an Attribute maintains a record of what domain helps in the generation of an associated Column. The System map associated with that Column also maintains a record of this information. There are special rules for data type reconciliation. The default action is to overwrite all values in the target Column with values derived from the source Attribute. When the Advisor interaction level is set at maximum, the user is prompted via a specific Advisor, e.g., Changing Value Advisor, to confirm any value that may be overwritten.

When the user engineers both into and from the same target design, the system reconciles the data type of the SDO with that of its corresponding object in the target design. Except for some predetermined instances, the system always overwrites the target data type with the default for that data type.

For example, and as shown in Table IV above, Attributes of type Variable-precision Real, i.e., values expressed in scientific notation, are by default forward engineered into Columns of type REAL. If the data type of that Column is modified from REAL to FLOAT or DOUBLE PRECISION and then reverse engineered, the system translates the data type back into REAL. In the preferred embodiment, Attributes of data type ALPHABETIC or ALPHANUMERIC are by default engineered into columns of type CHAR, VARCHAR, or LONG VARCHAR, depending on the length of the Column and whether the expected length is equal to or not equal to the maximum length. If the data type of that Column is then modified from CHAR to VARCHAR or LONG VARCHAR, or vice versa and then engineered, the system translates the data type back into ALPHABETIC or ALPHANUMERIC, depending on what it originally was in the information model. For each of these Attributes, the next time the user engineers, the system retains the user's previous choice for that Column.

Like partnerships, discussed above, partnership sets (PSETS) may be processed as objects, and are essentially the relationships between Entities. The partnership and the two PSETS associated with it constitute the processing unit. All pairs of PSETS are either translated into a Foreign Key, two Foreign Keys, or a Reference Table and two Foreign Keys and a Primary Key. The translation depends on the type of partnership, i.e., one-to-one, one-to-many, many-to-many. A one-to-one partnership is only translated into Foreign Keys on the corresponding Tables of the owning Entities of the PSETS. When a PSET is mandatory, it must have a Foreign Key on the corresponding Table of the owning Entity of the Mandatory PSET. A one-to-many relationship is only translated into a Foreign Key owned by the corresponding Table of the owning Entity of the PSET on the one side. A many-to-many relationship is only translated into a Reference Table.

The Columns that constitute Foreign Keys are derived from the Primary Key of an Entity that is the PARENT of the relationship expressed by the two PSETS. To determine which Entity is the PARENT Entity, engineering determines what kind of relationship is being translated into a Foreign Key and how that relationship is represented by a Foreign Key. When a one-to-many relationship is specified by two PSETS, the PARENT Entity is the Entity that resides on the "one" side of the relationship.

Figure 6:
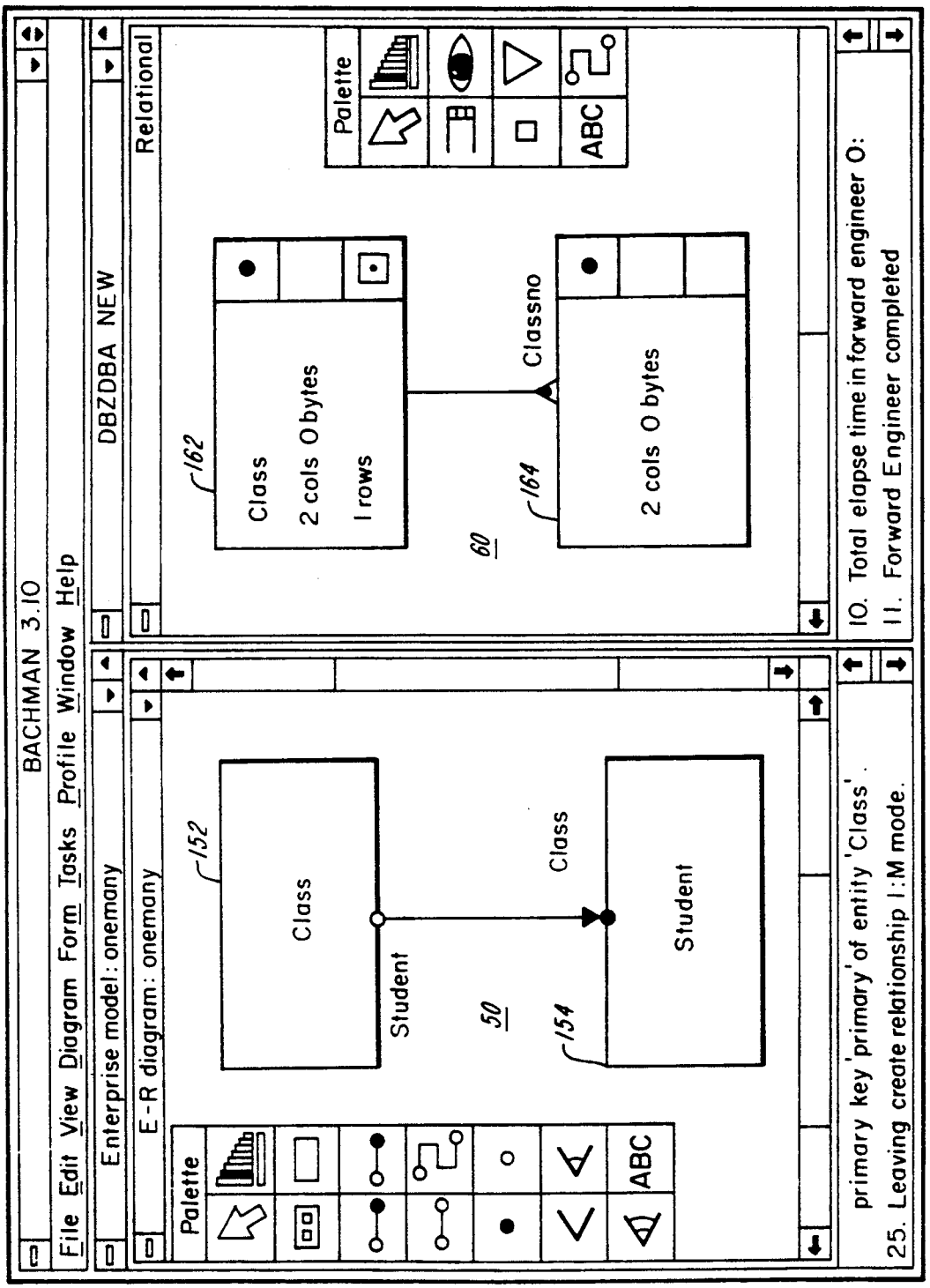
FIG. 6 shows an extended entity diagram, and a relational diagram of the invention, showing a one-to-many relationship.

FIG. 6 illustrates this process in a split screen format, with the left side 50 of FIG. 6 representing the extended entity model (Analyst) and the right side 60 representing the relational model (DB2). The PARENT Entity 152 shown in FIG. 6 in the extended entity model is "CLASS" The CHILD entity 154 is "STUDENT". Those entities 152 and 154 are shown in the relational model as Table "CLASS" 162 and Table "STUDENT" 164.

Figure 7:
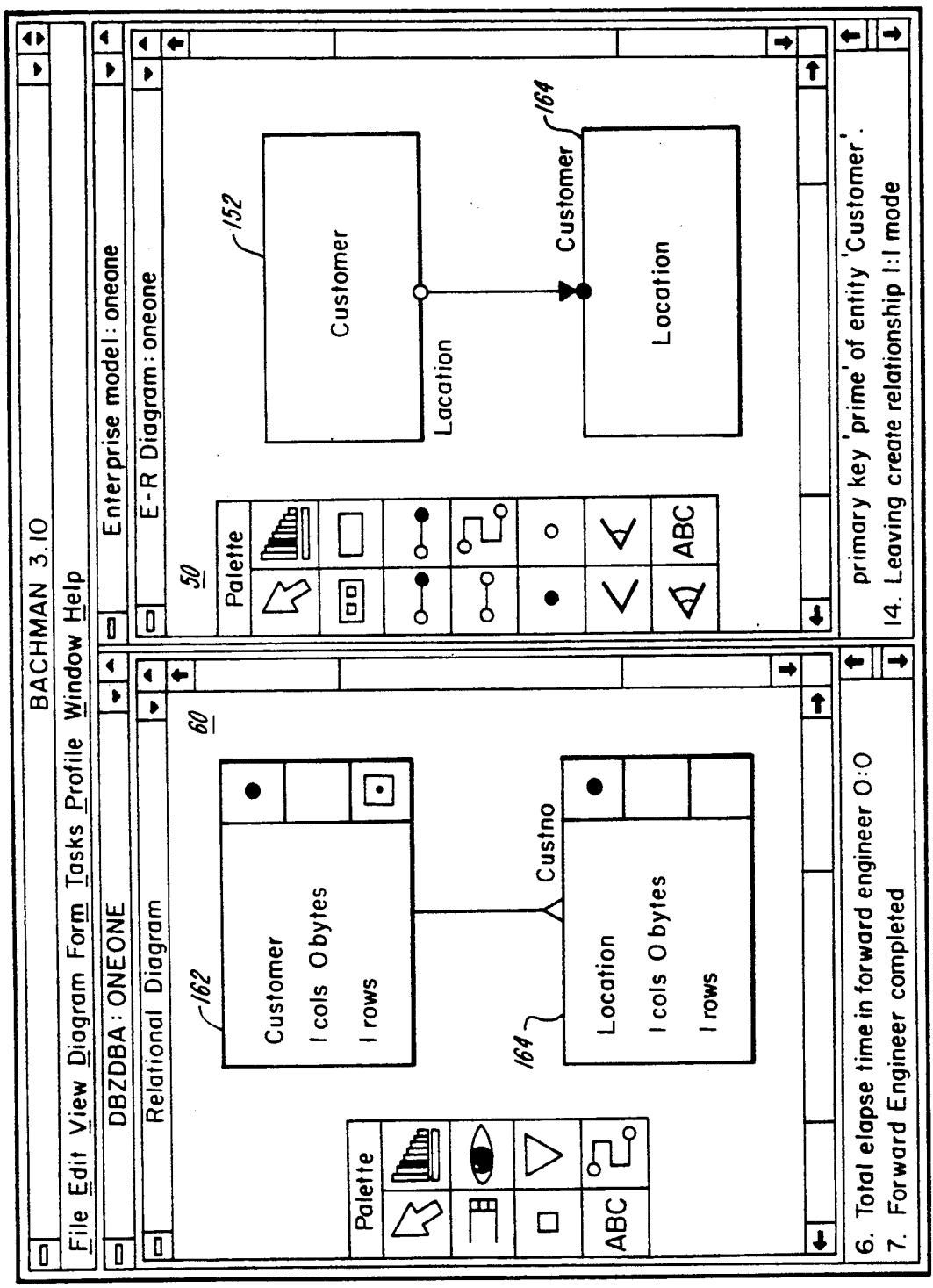
FIG. 7 shows an extended entity diagram, and a relational diagram, showing a one-to-one relationship.

When a one-to-one relationship contains only one Mandatory PSET, the PARENT Entity is the owning Entity of the other PSET. In FIG. 7, the PARENT Entity 152 is "CUSTOMER" and the CHILD entity 154 is "LOCATION". Those entities are represented in the relational model by corresponding tables 162 and 164.

Figure 8:
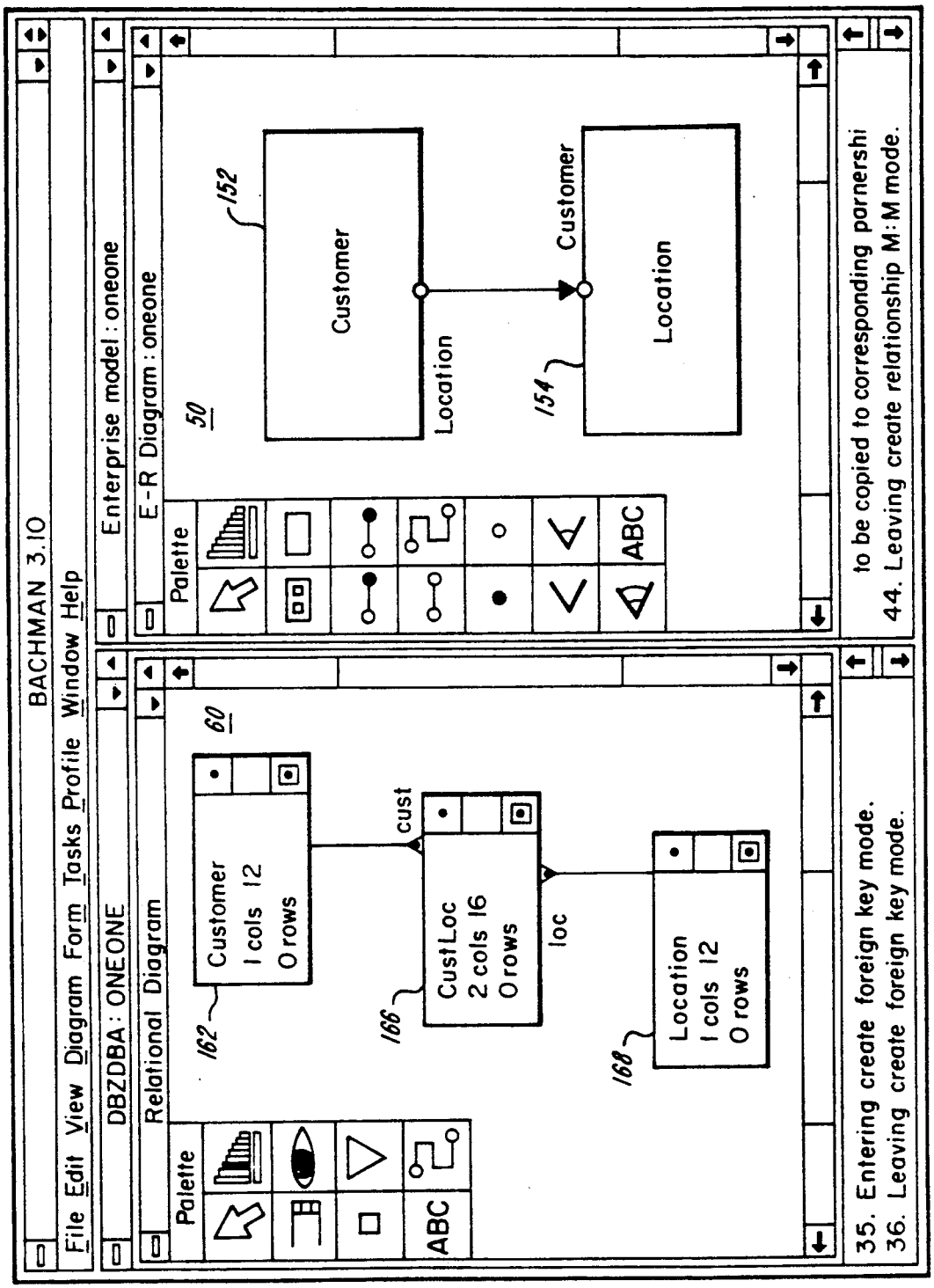
FIG. 8 shows an extended entity diagram, and a relational diagram, showing a many-to-many relationship with two Foreign Keys.

As shown in FIG. 8, in the case where both the PSETS are mandatory or optional, the one-to-one relationship is represented by two Foreign Keys where each Table owns one of Foreign Keys 166 and 168 and the PARENT Entity 152 is on the opposite end.

In a one-to-many relationship, if the PSET that is on the "many" side of the relationship is mandatory, the resulting Foreign Key has a Primary Key Delete Rule of "RESTRICT" as a default setting. If the same PSET is optional, then the Primary Key Delete Rule is "SET NULL". The Foreign Key Unique value for the new Foreign Key is "NO". On a one-to-one relationship, if the PSET corresponding to Foreign Key is optional, the Foreign Key Unique value is also "NO", and the Primary Key Delete Rule is also set to "SET NULL". In a many-to-many relationship, two Foreign Keys have a Primary Key Delete Rule of "RESTRICT". The design statistics information for the resulting Reference Table is derived by multiplying the volume information from one of the Entities and the PSET it owns. The result of the multiplication is the value for the "Initial Number of Rows".

NAME GENERATION AND CONTROL

To provide more control over naming newly created objects, setting default names, and controlling name translations during engineering, a naming standard is included in the system of the invention. Sub-processes of the naming standards allow users to specify a naming standard to be enforced in one or both design spaces. By using a naming standard, or template, objects created in one design space are readily traceable in another design space. In the preferred embodiment, it also specifies how Analyst design object names are translated into DB2 names. This is achieved through two sub-process: Object Name Specification; and Engineering Translation.

An Object Name Specification (ONS) allows a user to specify how the name of an object is constructed in the source design space. This sub-process handles all the information necessary to derive default names for newly created objects, provide naming templates for forms input, detect naming standards violations, and assist users transform names of objects so that they conform to naming standards. An ONS is used to establish a unique component of the name of an object. For example, an ONS may use the eighteen character portion of a Table name as the unique component, independent of which user created and/or subsequently changed that Table. In this manner, the ONS maintains a unique component of an object name through all modifications to that object. This unique component is unique for naming purposes, and is not necessarily involved in establishing the unique identifier for that object, as discussed above.

In the preferred embodiment, objects are grouped in classes, where the ONS's are related for each object of a class. Each ONS includes three components: a Sequence Base Number (SBN); a Sequence Increment Value (SIV); and a group of Position Control Specifications (PCS's). The SBN of an ONS enumerates the class of all newly created objects. For example, in the preferred embodiment, every class of DB2 objects has an SBN associated with only that class. Within a class, the SIV determines a unique offset (or increment) associated with the SBN for that object. The magnitude of increment used when a new object is created within a class is specified by the SIV of the ONS. The incremental SBN for an object is its "Sequence Number." The Sequence Number for an object has a value corresponding to the Sequence Number for the next previously created object of that class, as modified by the SIV. For example, in the preferred embodiment, if the SIV is 1 for the class of objects "tablespaces", then every new Tablespace object created will have a Sequence Number that is 1 higher than the incremental SBN for the next previously created Tablespace object.

The PCS determines the type of value that can be entered in a given position of the name of an object, as well as any default values and how those default values are derived. The group of PCS's that are included in the name of an object determines how the name looks to the user, and how naming standards will be enforced. For example, a Table would have eighteen PCS's, one for each character of a Table name, and these PCS's as a group provide the template for a Table naming standard.

A PCS consists of three attributes: Control Identifier (CI); Value; and Derived Object Position. Only the CI is required for all PCS definitions. The CI determines the type of values that may be used in any given position of a name of an object. It also defines how a default value will be derived. In the preferred embodiment, valid CI values include: Constant Value (C); Numeric Value (N); Alphabetic Value (A); Alphanumeric Value (AN); Sequencing Position (SEQ); and Object Derived (OD).

A Constant Value must always be supplied in the position specified. When a position CI is a Constant Value, a value must also be supplied as part of the PCS This value may be any valid character for the specified position, e.g., a numeric value could not be specified for position 1.

When the Numeric Value CI is used, only numeric values may be used in this position. When the Alphabetic Value CI is used, only alphabetic characters may be supplied as values in this position. When the Alphanumeric Value CI is used, only alphanumeric characters may be supplied as values in this position. No value need be specified for a position with either an N, A, or AN PCS.

When the Sequence Position CI is used, the position will be used to assign default sequence numbers to newly created objects. For example, if position 8 of Tablespace ONS had a PCS of SEQ, every new Tablespace created will increment a sequence number and the number would be placed in position 8 of the Tablespace name. If only position 8 were used as the SEQ position of the Tablespace name, then the number of new Tablespace objects that could be created with unique sequence numbers would be ten. This may not be a desirable condition for all objects, and so in the preferred embodiment, every object class that allows Sequence Positions in the ONS allows at least two consecutive positions. For example, if position 7 and 8 of the Tablespace name specification had SEQ defined as the control specification then the number of new Tablespaces that could be created with unique SEQ numbers would be one hundred. In other embodiments, a different number of Sequence Positions may be used in a similar manner.

Finally, an Object Derived CI allows portions of the name to be derived from other objects in the design where the objects have a hierarchical ranking. A user may want to derive portions of a table name from the Table's Tablespace, or a Tablespace name for a Database name. Objects can only have their names derived from objects of a superior rank. Whenever an OD CI is used, a PCS value must be supplied. For example, if a Tablespace has an OD CI for position 5, then the only valid value that may be supplied for the PCS value is DB. A Derived Object Position must also be specified when an OD CI is used. The Derived Object Position indicates which position in the superior object's name is used. For example, in the above example, if the CI is OD, and the PCS value is DB, then the Derived Object Position could be a value from 1 to 8, indicating that any of the eight characters used in the Database name may be used in that position.

In the preferred embodiment, when an object name is derived from another object, and the name of that object has fewer characters than specified by the ONS, then by default the SEQ position is shifted to the left until the gap between the end of an allowable name length and the actual name length is closed.

The other major component of the naming standard sub-process is Engineering Translation. The basic function of this sub-process is to allow a user to control the names generated during forward/reverse engineering. Names specified by maps are always respected during an engineering process, i.e., no naming standard specification takes precedence over the map name specification.

The Engineering Translation sub-process includes two components, Engineering Name Specification (ENS) and Token Substitution (TS), which drive the sub-process. The ENS is essentially the same as the ONS, except it will only support Table, Column(s), and Foreign Key(s). In the preferred embodiment, Primary Key naming is not an issue, since all Primary Key objects are assigned a predetermined name: PRIMARY. ENS's are essentially special case instances of ONS's and are processed using substantially the same sub-process. Every ENS consists of a group of PCS's, as in the ONS, but does not have a separate Sequence Base Number or Sequence Increment Value.

When the name of an object must be reduced to fit into a specified number of characters, the Token Substitution (TS) sub-process generates meaningful abbreviations. Token Substitution translates Business Terms to abbreviations during forward engineering, and abbreviations to Business Terms during reverse engineering. In operation, the name of an object is first "token-ized" to determine substitutions which must occur. A name that is being reduced is the source name string. A source name string is reduced to one or more tokens before substitution. For example, the source name string "Account-author" results in two tokens, "Account" and "Author". These two tokens are substituted with the abbreviations "ACCT" and "AUTH". The result of this substitution is the shorter name string, "ACCT AUTH". In the preferred embodiment, the character "—" is replaced by the character "_", since DB2 does not allow the use of a "—" character.

When Token Substitution is complete, and the reduced string is still too long to fit into the specified number of characters, vowels are stripped from the reduced string starting from the right. However, a vowel at the beginning of a token is not stripped. Thus, if the reduced string had to be 8 characters long, in the example above, the resulting string would be "ACCT_AUTH". When all vowel stripping and truncation does not yield a unique name string during engineering, then a SEQ number is used in the last position of the object name. In the preferred embodiment, the last position of Column and Table names are used to make a string unique if reduction of a string does not work. The system makes the sequence number as large as it has to be to make the name unique even if it violates the defined specification.

Default object names are generally derived from Object Name Specifications in all cases. Some classes of objects have more than one ONS. For example, Tablespace has two ONS's, as does Foreign Key, since it is desirable to derive a default Tablespace Name from the Table name when the name is known.

VERIFICATION

Following the transformation phase of engineering, the next phase of the system involves verification that the two data models map to each other. In FIG. 2, this is referred to as TARGET PROCESSING 42. This phase is responsible for looking at objects contained in the target design space having System maps which refer to objects in the source design space. The phase also verifies that the two designs, or data models, are still in sync before completing engineering. TARGET PROCESSING 42 is also responsible for placing a NULL map on any object not touched by engineering to this point in the system. This phase is activated after SOURCE PROCESSING 32 is completed.

TARGET PROCESSING 42 or verification includes identification of instances when the target design space is inconsistent with the source design space. It identifies instances when a related SDO has been deleted or removed from the source design space, and when a related SDO has a new Null map associated with a target design space. In each instance, the user is notified by an appropriate Advisor.

In the preferred embodiment, there are three possible actions by TARGET PROCESSING 42, responsive to the condition of the design spaces. One action is "nullify target", which removes the TDO reference to the source design. Another action is "delete propagate", which removes the object in question from the target design space. The third action is "delete map", which deletes the map associated with the TDO in question. The following Table V illustrates exemplary actions in the preferred embodiment of the system, in relation to the design space conditions (default actions in bold type):

TABLE V

|  | TDO Maps Refer to Other Objects in Source Design | TDO Maps Do Not Refer to Other Objects in Source Design |
| --- | --- | --- |
| Source Object Deleted | Delete Map | Nullify Delete propagate Advisor |
| Source Object Nulled | Delete Map | Nullify Delete Map Delete propagate Advisor |

The specification, or outcome, of the system described above, may be converted into code and implemented to produce a working application system. That conversion may be accomplished manually, or under the control of a programmed digital computer.

The invention may be embodied in other specific forms without departing from the spirit or essential characteristics thereof. The current embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A digital computer implemented method for automatically coordinating objects in a first data model, said first data model having source design objects in a source design space, with corresponding objects in a second data model, said second data model having target design objects in a target design space, one or more of said target design objects being associated with a corresponding one of said source design objects, and for synchronizing, in real time, said first data model and said second data model, comprising steps of:
   A. associating a unique source identifier with each of said source design objects;
   B. associating at least one selectively modifiable source map with one or more of said source design objects, said source map having source map objects and being associated with said unique source identifier for said one or more of said source design objects, at least one of said source map objects being representative of source parameters for use in implementing a predetermined set of rules in said source design space, said rules including source design object transformation rules;
   C. associating a unique target identifier with each of said target design objects;
   D. associating at least one selectively modifiable target map with one or more of said target design objects, said target map having target map objects and being associated with said unique target identifier for said one or more of said target design objects, at least one of said target map objects being representative of target parameters for use in implementing said predetermined set of rules in said target design space;
   E. generating from one or more of said source design objects one or more conversion objects in said target design space in accordance with said source design object transformation rules, said conversion objects each having an associated conversion map; and F. merging one or more of said conversion objects and said associated conversion maps into one or more of said corresponding target design objects and said associated target maps to establish a merged object and associated merged map, whereby said one or more of said target design objects have their associated unique target identifier related to said unique source identifier associated with said one or more of said source design objects.

2. The method according to claim 1 wherein said source design map and said target design map define a single composite map in a distinct design space, the method further comprising steps of:
   A. associating a unique composite map identifier with said composite map;
   B. establishing a unique relationship between said composite map identifier and said source design objects; and
   C. establishing a unique relationship between said composite map identifier and said target design objects.

3. The method according to claim 2 wherein step (B) includes establishing one or more system maps and one or more user maps and associating one or more of said system maps and one or more of said user maps with one or more of said source design objects, said system maps being immutable by a user and said user maps being selectively modifiable by said user.

4. The method according to claim 3 wherein step (D) includes establishing one or more system maps and one or more user maps and associating one or more of said system maps and one or more of said user maps with one or more of said target design objects, said system maps being immutable by a user and said user maps being selectively modifiable by said user.

5. The method according to claim 4 further comprising a step, prior to said converting step (E) for a source design object, of:
   identifying zero, one, or more target design objects in said target design space, as being said target design objects associated with said corresponding one of said source design objects, said association being represented by system map objects in said system maps.

6. The method according to claim 5 wherein said identifying step further comprises substeps of:
   A. identifying instances when zero target design objects are identified; and
   B. initiating an action in response to said identified instance, said action including one from the set consisting of delete said source map associated with said corresponding one of said source design objects, rebuild a user map, and create a null map for said source design objects in said target design space.

7. The method according to claim 5 wherein steps (A) through (F) are sequentially performed for each of said source design objects in said source design space.

8. The method according to claim 2 wherein steps (A) through (F) are sequentially performed for each of said source design objects in said source design space.

9. The method according to claim 8 wherein said source design space includes one or more classtypes of said source design objects, and wherein steps (A) through (F) are further sequentially performed for each of said source design objects of a similar classtype.

10. The method according to claim 9 wherein each of said classtypes includes an associated hierarchy value, and wherein said steps (A) through (F) are further sequentially performed in accordance with said hierarchy value.

11. The method according to claim 2 wherein said target map includes a reference to zero, one, or more of said source design objects, said method further comprising steps of:
   A. for at least one of said target design objects, identifying instances when said reference is to zero of said source design objects, said instances being representative of a null reference; and
   B. responsive to identification of said null reference, selectively modifying said one of said target design objects and said target map associated with said one of said target design objects in accordance with a predetermined action.

12. The method according to claim 11 wherein said predetermined action is a nullify target action, including a substep of removing said reference from said target map associated with said one of said target design objects.

13. The method according to claim 11 wherein said predetermined action is a delete map action, including the substep of deleting said associated target map.

14. The method according to claim 11 wherein said predetermined action is a delete propagate action, including a substep of removing said one of said target design objects from said target design space.

15. The method according to claim 2 further comprising a step of generating a template for naming each of said source design objects and each of said target design objects, said template including a selectively predetermined object identifier, and a selectively modifiable object variable.

16. The method according to claim 15 wherein each of said conversion objects in said target design space includes an associated name, and each of said target design objects in said target design space includes an associated name, and wherein said merging step (F) further comprises steps of:
   A. identifying instances when said conversion map associated with one of said conversion objects does not match said target map associated with one of said target design objects, and said name associated with said one conversion object does not match said name associated with said one target design object; and
   B. initiating addition of said one conversion object to said target design space for said instances identified.

17. The method according to claim 2 wherein said merging step (F) further comprises the substeps of:
   A. comparing said merged object with said predetermined set of rules;
   B. identifying instances when said merged map is inconsistent with ones of said rules; and
   C. generating a signal representative of each of said instances.

18. The method according to claim 17 further comprising substep of resolving, following said generated signal, said instances when said merged map is inconsistent with ones of said rules in response to external input.

19. The method according to claim 2 wherein each of said target design objects includes a reference to zero, one, or more of said source design objects, said method further comprising the steps of:

A. for at least one of said target design objects, identifying instances when said reference is to zero of said source design objects, said instances being representative of a null reference; and B. responsive to identification of said null reference, selectively modifying said one of said target design objects in accordance with a predetermined action.

20. The method according to claim 19 wherein said predetermined action is a delete propagate action, including the substep of removing said one of said target design objects from said target design space.

21. The method according to claim 2 wherein each of said conversion objects includes an associated name, and each of said target design objects includes an associated name, and wherein said merging step (F) further comprises substeps of:
   A. identifying instances when one of said conversion objects has an associated name that matches said name associated with one of said target design objects and said conversion map associated with said one conversion object matches said target map associated with said one target design object; and
   B. fusing said one conversion object with said one target design object, including the further substep of over-writing properties of said one conversion object to said one target design object for each of said instances identified.

22. The method according to claim 2 wherein each of said conversion objects includes an associated name, and each of said target design objects includes an associated name, and wherein said merging step (F) further comprises steps of:
   A. identifying instances when said name associated with one of said conversion objects matches said name associated with one of said target design objects, and said conversion map associated with said one conversion object does not match said target map of said one target design object;
   B. generating a signal representative of each of said instances identified; and
   C. initiating an action in response to external input, said external input being responsive to said signal, said action including one from the set consisting of:
      i. append said conversion map associated with said one conversion object to said target map associated with said one target design object;
      ii. rename said one conversion object; and,
      iii. append said conversion map associated with said one conversion object to said target map associated with said one target design object;
      ii. rename said one conversion object; and,
      iii. append said conversion map associated with said one conversion object to said target map associated with said one target design object, then over-write properties of said conversion object to said one target design object.

23. The method according to claim 2 wherein each of said conversion objects in said target design space includes an associated name, and each of said target design objects in said target design space includes an associated name, and wherein said merging step (F) further comprises steps of:
   A. identifying instances when said conversion map associated with one of said conversion objects matches said target map associated with one of said target design objects, and said name associated with said one conversion object does not match said name associated with said one target design object;
   B. generating a signal representative of each of said instances identified; and
   C. initiating an action in response to external input, said external input being responsive to said signal, said action including one from the set consisting of:
      i. append said target map associated with said one target design object to said source design object associated with said one conversion object, build said one conversion object into said target design space, then over-write properties of said conversion object to said one target design object;
      ii. remove said target map associated with said one target design object, and build said one conversion object into said target design space; and,
      iii. replace said source design map associated with said corresponding one of said source design objects with said target map associated with said one target design object, then over-write properties of said source design object to said one target design object.

24. The method according to claim 2 wherein step (D) includes establishing one or more system maps and one or more user maps and associating one or more of said system maps and one or more of said user maps with one or more of said target design objects, said system maps being immutable by a user and said user maps being selectively modifiable by said user.

25. The method according to claim 2 wherein each of said target design objects is selectively modifiable by a user, said method further comprising a step of maintaining said unique target identifier associated with each modified target design object.

26. The method according to claim 1 wherein said first data model is a relational data model, and said second data model is an extended entity data model.

27. The method according to claim 1 wherein said first data model is an extended entity data model, and said second data model is a relational model.

28. The method according to claim 27 wherein steps (A) through (F) are sequentially performed for each of said source design objects in said source design space.

29. The method according to claim 28 wherein said source design space includes one or more classtypes of said source design objects, and wherein steps (A) through (F) are further sequentially performed for each of said source design objects of a similar classtype.

30. The method according to claim 29 wherein each of said classtypes includes an associated hierarchy value, and wherein said steps (A) through (F) are further sequentially performed in accordance with said hierarchy value.

31. The method according to claim 27 wherein step (B) includes establishing one or more system maps and one or more user maps and associating one or more of said system maps and one or more of said user maps with one or more of said source design objects, said system maps being immutable by a user and said user maps being selectively modifiable by said user.

32. The method according to claim 31 wherein step (D) includes establishing one or more system maps and one or more user maps and associating one or more of said system maps and one or more of said user maps with one or more of said target design objects, said system maps being immutable by a user and said user maps being selectively modifiable by said user.

33. The method according to claim 32 further comprising a step, prior to said converting step (E) for a source design object, of:

identifying zero, one, or more of said target design objects in said target design space, as being said target design objects associated with said corresponding one of said source design objects, said association being represented by system map objects in said system maps.

34. The method according to claim 33 wherein said identifying step further comprises substeps of:

A. identifying instances when zero target design objects are identified; and

B. initiating an action in response to said identified instances, said action including one from the set consisting of delete said source map associated with said corresponding one of said source design objects, rebuild a user map, and create a null map for said corresponding one of said source design objects in said target design space.

35. The method according to claim 33 wherein steps (A) through (F) are sequentially performed for each of said source design objects in said source design space.

36. The method according to claim 1 wherein step (B) includes establishing one or more system maps and one or more user maps and associating one or more of said system maps and one or more of said user maps with one or more of said source design objects, said system maps being immutable by a user and said user maps being selectively modifiable by said user.

37. The method according to claim 36 wherein step (D) includes establishing one or more system maps and one or more user maps and associating one or more of said system maps and one or more of said user maps with at least one of said target design objects, said system maps being immutable by a user and said user maps being selectively modifiable by said user.

38. The method according to claim 37 further comprising a step, prior to said step (E) for a source design object, of:

identifying zero, one, or more of said target design objects in said target design space, as being said target design objects associated with said corresponding one of said source design objects, said association being represented by system map objects in said system maps.

39. The method according to claim 38 wherein said identifying step further comprises substeps of:

A. identifying instances when zero target design objects are identified; and

B. initiating an action in response to said identified instance, said action including one from the set consisting of delete said source map associated with said corresponding one of said source design objects, rebuild a user map, and create a null map for said corresponding one of said source design objects in said target design space.

40. The method according to claim 38 wherein steps (A) through (F) are sequentially performed for each of said source design objects in said source design space.

41. The method according to claim 1 wherein steps (A) through (F) are sequentially performed for each of said source design objects in said source design space.

42. The method according to claim 41 wherein said source design space includes one or more classtypes of source design objects, and wherein steps (A) through (F) are further sequentially performed for each of said source design objects of a similar classtype.

43. The method according to claim 42 wherein each of said classtypes includes an associated hierarchy value, and wherein said steps (A) through (F) are further sequentially performed in accordance with said hierarchy value.

44. The method according to claim 1 further comprising a step of generating a template for naming each of said source design objects and each of said target design objects, said template including a selectively predetermined object identifier, and a selectively modifiable object variable.

45. The method according to claim 44 wherein each of said conversion objects in said target design space includes an associated name, and each of said target design objects in said target design space includes an associated name, and wherein said merging step (F) further comprises steps of:

A. identifying instances when said conversion map associated with one of said conversion objects does not match said target map associated with one of said target design objects, and said name associated with said one conversion object does not match said name associated with said one target design object; and B. initiating addition of said one conversion object to said target design space for said instances identified.

46. The method according to claim 1 wherein said merging step (F) further comprises the substeps of:

A. comparing said merged object with said predetermined set of rules;

B. identifying instances when said merged map is inconsistent with ones of said rules; and C. generating a signal representative of each of said instances.

47. The method according to claim 46 further comprising substep of resolving, following said generated signal, said instances when said merged map is inconsistent with ones of said rules in response to external input.

48. The method according to claim 1 wherein said target map includes a reference to zero, one, or more of said source design objects, said method further comprising steps of:

A. for at least one of said target design objects, identifying instances when said reference is to zero of said source design objects, said instances being representative of a null reference; and B. responsive to identification of said null reference, selectively modifying said one of said target design objects and said target map associated with said one of said target design objects in accordance with a predetermined action.

49. The method according to claim 48 wherein said predetermined action is a nullify target action, including the substep of removing said reference from said target map associated with said one of said target design objects.

50. The method according to claim 48 wherein said predetermined action is a delete map action, including substep of deleting said associated target map.

51. The method according to claim 48 wherein said predetermined action is a delete propagate action, including a substep of removing said one of said target design objects from said target design space.

52. The method according to claim 1 wherein each of said target design objects includes a reference to zero, one, or more of said source design objects, said method further comprising steps of:

A. for at least one of said target design objects, identifying instances when said reference is to zero of said source design objects, said instances being representative of a null reference; and B. responsive to identification of said null reference, selectively modifying said one of said target design objects in accordance with a predetermined action.

53. The method according to claim 52 wherein said predetermined action is a delete propagate action, including a substep of removing said one of said target design objects from said target design space.

54. The method according to claim 27 wherein said target map includes a reference to zero, one, or more of said source design objects, said method further comprising steps of:

A. for at least one of said target design objects, identifying instances when said reference is to zero of said source design objects, said instances being representative of a null reference; and B. responsive to identification of said null reference, selectively modifying said one of said target design objects and said target map associated with said one of said target design objects in accordance with a predetermined action.

55. The method according to claim 54 wherein said predetermined action is a nullify target action, including a substep of removing said reference from said target map associated with said one of said target design objects.

56. The method according to claim 54 wherein said predetermined action is a delete map action, including a substep of deleting said target map associated with said one of said target design objects.

57. The method according to claim 54 wherein said predetermined action is a delete propagate action, including a substep of removing said one of said target design objects from said target design space.

58. The method according to claim 27 wherein said merging step (F) further comprises substeps of:

A. comparing said merged object with said predetermined set of rules;

B. identifying instances when said merged map is inconsistent with ones of said rules; and C. generating a signal representative of each of said instances.

59. The method according to claim 58 further comprising substep of resolving, following said generated signal, said instances when said merged map is inconsistent with ones of said rules in response to external input.

60. The method according to claim 27 wherein step (D) includes establishing one or more system maps and one or more user maps and associating one or more of said system maps and one or more of said user maps with one or more of said target design objects, said system maps being immutable by a user and said user maps being selectively modifiable by said user.

61. The method according to claim 27 further comprising a step of generating a template for naming each of said source design objects and each of said target design objects, said template including a selectively predetermined object identifier, and a selectively modifiable object variable.

62. The method according to claim 27 wherein each of said conversion objects includes an associated name, and each of said target design objects includes an associated name, and wherein said merging step (F) further comprises substeps of:

A. identifying instances when one of said conversion objects has an associated name that matches said name associated with one of said target design objects and said conversion map associated with said one conversion object matches said target map associated with said one target design object; and B. fusing said one conversion object with said one target design object, including a further substep of over-writing properties of said one conversion object to said one target design object for each of said instances identified.

63. The method according to claim 27 wherein each of said conversion objects includes an associated name, and each of said target design objects includes an associated name, and wherein said merging step (F) further comprises steps of:

A. identifying instances when said name associated with one of said conversion objects matches said name associated with one of said target design objects, and said conversion map associated with said one conversion object does not match said target map of said one target design object;

B. generating a signal representative of each of said instances identified; and

C. initiating an action in response to external input, said external input being responsive to said signal, said action including one from the set consisting of:
  i. append said conversion map associated with said one conversion object to said target map associated with said one target design object;
  ii. rename said one conversion object; and,
  iii. append said conversion map associated with said one conversion object to said target map associated with said one target design object, then over-write properties of said conversion object to said one target design object.

64. The method according to claim 27 wherein each of said conversion objects in said target design space includes an associated name, and each of said target design objects in said target design space includes an associated name, and wherein said merging step (F) further comprises steps of:

A. identifying instances when said conversion map associated with one of said conversion objects matches said target map associated with one of said target design objects, and said name associated with said one conversion object does not match said name associated with said one target design object;

B. generating a signal representative of each of said instances identified; and

C. initiating an action in response to external input, said external input being responsive to said signal, said action including one from the set consisting of:
  i. append said target map associated with said one target design object to said source design object associated with said one conversion object, build said one conversion object into said target design space, then over-write properties of said conversion object to said one target design object;
  ii. remove said target map associated with said one target design object, and build said one conversion object into said target design space; and,
  iii. replace said source design map associated with said corresponding one of said source design objects with said target map associated with said one target design object, then over-write properties of said source design object to said one target design object.

65. The method according to claim 27 wherein each of said conversion objects in said target design space includes an associated name, and each of said target design objects in said target design space includes an associated name, and wherein said merging step (F) further comprises steps of:
   A. identifying instances when said conversion map associated with one of said conversion objects does not match said target map associated with one of said target design objects, and said name associated with said one conversion object does not match said name associated with said one target design object; and
   B. initiating addition of said one conversion object to said target design space for said instances identified.

66. The method according to claim 27 wherein each of said target design objects includes a reference to zero, one, or more of said source design objects, said method further comprising steps of:
   A. for at least one of said target design objects, identifying instances when said reference is to zero of said source design objects, said instances being representative of a null reference; and
   B. responsive to identification of said null reference, selectively modifying said one of said target design objects in accordance with a predetermined action.

67. The method according to claim 66 wherein said predetermined action is a delete propagate action, including a substep of removing said one of said target design objects from said target design space.

68. The method according to claim 27, wherein each of said target design objects is selectively modifiable by a user, said method further comprising a step of maintaining said unique target identifier associated with each modified target design object.

69. The method according to claim 1 wherein step (D) includes establishing one or more system maps and one or more user maps and associating one or more of said system maps and one or more of said user maps with one or more of said target design objects, said system maps being immutable by a user and said user maps being selectively modifiable by said user.

70. The method according to claim 1 wherein each of said conversion objects includes an associated name, and each of said target design objects includes an associated name, and wherein said merging step (F) further comprises substeps of:
   A. identifying instances when one of said conversion objects has an associated name that matches said name associated with one of said target design objects and said conversion map associated with said one conversion object matches said target map associated with said one target design object; and
   B. fusing said one conversion object with said one target design object, including the further substep of over-writing properties of said one conversion object to said one target design object for each of said instances identified.

71. The method according to claim 1 wherein each of said conversion objects includes an associated name, and each of said target design objects includes an associated name, and wherein said merging step (F) further comprises steps of:
   A. identifying instances when said name associated with one of said conversion objects matches said name associated with one of said target design objects, and said conversion map associated with said one conversion object does not match said target map of said one target design object;
   B. generating a signal representative of each of said instances identified; and
   C. initiating an action in response to external input, said external input being responsive to said signal, said action including one from the set consisting of:
      i. append said conversion map associated with said one conversion object to said target map associated with said one target design object;
      ii. rename said one conversion object; and,
      iii. append said conversion map associated with said one conversion object to said target map associated with said one target design object, then over-write properties of said conversion object to said one target design object.

72. The method according to claim 1 wherein each of said conversion objects in said target design space includes an associated name, and each of said target design objects in said target design space includes an associated name, and wherein said merging step (F) further comprises steps of:
   A. identifying instances when said conversion map associated with one of said conversion objects matches said target map associated with one of said target design objects, and said name associated with said one conversion object does not match said name associated with said one target design object;
   B. generating a signal representative of each of said instances identified; and
   C. initiating an action in response to external input, said external input being responsive to said signal, said action including one from the set consisting of:
      i. append said target map associated with said one target design object to said source design object associated with said one conversion object, build said one conversion object into said target design space, then over-write properties of said conversion object to said one target design object;
      ii. remove said target map associated with said one target design object, and build said one conversion object into said target design space; and,
      iii. replace said source design map associated with said corresponding one of said source design objects with said target map associated with said one target design object, then over-write properties of said source design object to said one target design object.

73. The method according to claim 1 wherein each of said target design objects is selectively modifiable by a user, said method further comprising a step of maintaining said unique target identifier associated with each modified target design object.

74. An apparatus for automatically coordinating objects in a first data model, said first data model having source design objects in a source design space, with corresponding objects in a second data model, said second data model having target design objects in a target design space, at least one of said target design objects being associated with a corresponding one of said source design objects, and for synchronizing, in real time, said first data model and said second data model, comprising:
   A. means for associating a unique source identifier with each of said source design objects;

B. source map means for associating one or more selectively modifiable source maps with one or more of said source design objects, each of said source maps having source map objects and being associated with said unique source identifier for said one or more of said source design objects, at least one of said source map objects being representative of source parameters for use in implementing a predetermined set of rules in a source design space, said rules including source design object transformation rules;

C. means for associating a unique target identifier with each of said target design objects;

D. target map means for associating one or more selectively modifiable target maps with one or more of said target design objects, each of said target maps having target map objects and being associated with said unique target identifier for said one or more of said target design objects, at least one of said target map objects being representative of target parameters for use in implementing said predetermined set of rules in a target design space;

E. conversion means for generating, from one or more of said source design objects, one or more conversion objects in said target design space in accordance with said source design object transformation rules, said conversion objects each having an associated conversion map; and F. merging means for merging one or more of said conversion objects and said associated conversion maps into one or more of said corresponding target design objects and said associated target maps to establish a merged object and associated merged map, whereby said one or more of said target design objects have their associated unique target identifier related to said unique source identifier associated with said one or more of said source design objects.

75. Apparatus according to claim 74 wherein said first data model is an extended entity data model, and said second data model is a relational model.

76. Apparatus according to claim 74 further comprising controller means for controlling operations of said means (A) through (F) to be sequentially operative in a predetermined order for each of said source design objects in said source design space.

77. Apparatus according to claim 76 wherein said source design space includes one or more classtypes of source design objects, said controller means operating said means (A) through (F) to be sequentially operative in a predetermined order for each of said source design objects of a similar classtype.

78. Apparatus according to claim 77 wherein each of said classtypes includes an associated hierarchy value, and wherein said predetermined order is in accordance with said hierarchy value.

79. Apparatus according to claim 74 wherein said source map means includes means for establishing one or more system maps and one or more user maps, and means for associating one or more of said system maps and one or more of said user maps with one or more of said source design objects, said system maps being immutable by a user and said user maps being selectively modifiable by said user.

80. Apparatus according to claim 79 wherein said target map means includes means for establishing one or more system maps and one or more user maps, and means for associating one or more of said system maps and one or more of said user maps with one or more of said target design objects, said system map being immutable by a user and said user maps being selectively modifiable by said user.

81. Apparatus according to claim 80 further comprising ID means for identifying zero, one, or more target design objects in said target design space, as being said target design objects associated with said corresponding one of said source design objects, said association being represented by system map objects in said system maps.

82. Apparatus according to claim 81 wherein said ID means further comprises:
   A. means for identifying instances when zero target design objects are identified; and
   B. response means for acting in response to said identified instance, said response means including one from the set consisting of: means for deleting said source map associated with said corresponding one of said source design objects; means for rebuilding a user map; and, means for creating a null map for said corresponding one of said source design objects in said target design space.

83. Apparatus according to claim 81 further comprising controller means for controlling said means (A) through (F) to be sequentially operative in a predetermined order for each source design object in said source design space.

84. Apparatus according to claim 74 wherein said target map means includes means for establishing one or more system maps and one or more user maps, and means for associating one or more of said system maps and one or more of said user maps with one or more of said target design objects, said system maps being immutable by a user and said user maps being selectively modifiable by said user.

85. Apparatus according to claim 74 further comprising naming means for generating a template for naming each of said source design objects and each of said target design objects, said template including a selectively predetermined object identifier, and a selectively modifiable object variable.

86. Apparatus according to claim 74 wherein each of said conversion objects includes an associated name, and each of said target design objects includes an associated name, and wherein said merging means further comprises:
   A. means for identifying instances when one of said conversion objects has an associated name that matches one of said names associated with said target design objects and said conversion map associated with said one conversion object matches said target map associated with said one identified target design object; and
   B. fusing means for fusing said one conversion object with said one target design object, including means for over-writing properties of said conversion object to said one target design object for each of said instances identified.

87. Apparatus according to claim 74 wherein each of said conversion objects includes an associated name, and each of said target design objects includes an associated name, wherein said merging means further comprises:
   A. means for identifying instances when said name associated with one of said conversion objects matches said name associated with one of said target design objects, and said conversion map associated with said one conversion object does not match said target map of said one target design object;

B. signal means for generating a signal representative of each of said instances identified; and C. response means for responding to external input, said external input being responsive to said signal, said response means including one from the set consisting of:
  i. means for appending said conversion map to said target map associated with said one target design object;
  ii. means for renaming said one conversion object; and,
  iii. means for appending said conversion map associated with said one conversion object to said target map associated with said one target design object, and means for over-writing properties of said conversion object to said one target design object.

88. Apparatus according to claim 74 wherein each of said conversion objects in said target design space includes an associated name, and each of said target design objects in said target design space includes an associated name, wherein said merging means further comprises:
  A. means for identifying instances when said conversion map associated with one of said conversion objects matches said target map associated with one of said target design objects, and said name associated with said one conversion object does not match said name associated with said one target design object;
  B. signal means for generating a signal representative of each of said instances identified; and
  C. response means for responding to external input, said external input being responsive to said signal, said response means including one from the set consisting of:
    i. means for appending said target map associated with said one target design object to said source design object associated with said one conversion object, means for building said one conversion object into said target design space, and means for over-writing properties of said conversion object to said one target design object;
    ii. means for removing said target map associated with said one target design object, and means for building said one conversion object into said target design space; and,
    iii. means for replacing said source design map associated with said corresponding one of said source design objects with said target map associated with said one target design object, and means for over-writing properties of said source design object to said one target design object.

89. Apparatus according to claim 74 wherein each of said conversion objects in said target design space includes an associated name, and each of said target design objects in said target design space includes an associated name, wherein said merging means further comprises:
  A. means for identifying instances when said conversion map associated with one of said conversion objects does not match said target map associated with one of said target design objects, and said name associated with said one conversion object does not match said name associated with said one target design object; and
  B. means for initiating addition of said one conversion object to said target design space for said instances identified.

90. Apparatus according to claim 74 wherein said merging means further comprises:
  A. means for comparing said merged object with said predetermined set of rules;
  B means for identifying instances when said merged map is inconsistent with ones of said rules; and
  C. means for generating a signal representative of each of said instances.

91. Apparatus according to claim 90 further comprising means for resolving, following said generated signal, said instances when said merged map is inconsistent with ones of said rules in response to external input.

92. Apparatus according to claim 74 wherein each of said target design objects includes a reference to zero, one, or more of said source design objects, said apparatus further comprising:
  A. for at least one of said target design objects, means for identifying instances when said reference is to zero of said source design objects, said instances being representative of a null reference; and
  B. means, responsive to identification of said null reference, for selectively modifying said one of said target design objects in accordance with a predetermined action.

93. Apparatus according to claim 92 wherein said predetermined action is a delete propagate action, including means for removing said one of said target design objects from said target design space.

94. Apparatus according to claim 74 wherein said target map includes a reference to zero, one, or more of said source design objects, said apparatus further comprising:
  A. for at least one of said target design object, means for identifying instances when said reference is to zero of said source design objects, said instances being representative of a null reference; and
  B. means, responsive to identification of said null reference, for selectively modifying said one of said target design objects and said target map associated with said one of said target design objects in accordance with a predetermined action.

95. Apparatus according to claim 94 wherein said predetermined action is a nullify target action, including means for removing said reference from said target map associated with said one of said target design objects.

96. Apparatus according to claim 94 wherein said predetermined action is a delete map action, including means for deleting said target map associated with said one of said target design objects.

97. Apparatus according to claim 94 wherein said predetermined action is a delete propagate action, including means for removing said one of said target design objects from said target design space.

98. Apparatus according to claim 74, wherein each of said target design objects is selectively modifiable by a user, said method further comprising the step of maintaining said unique target identifier associated with each modified target design object.

* * * * *